Nov. 3, 1964      A. ZAROUNI      3,155,775

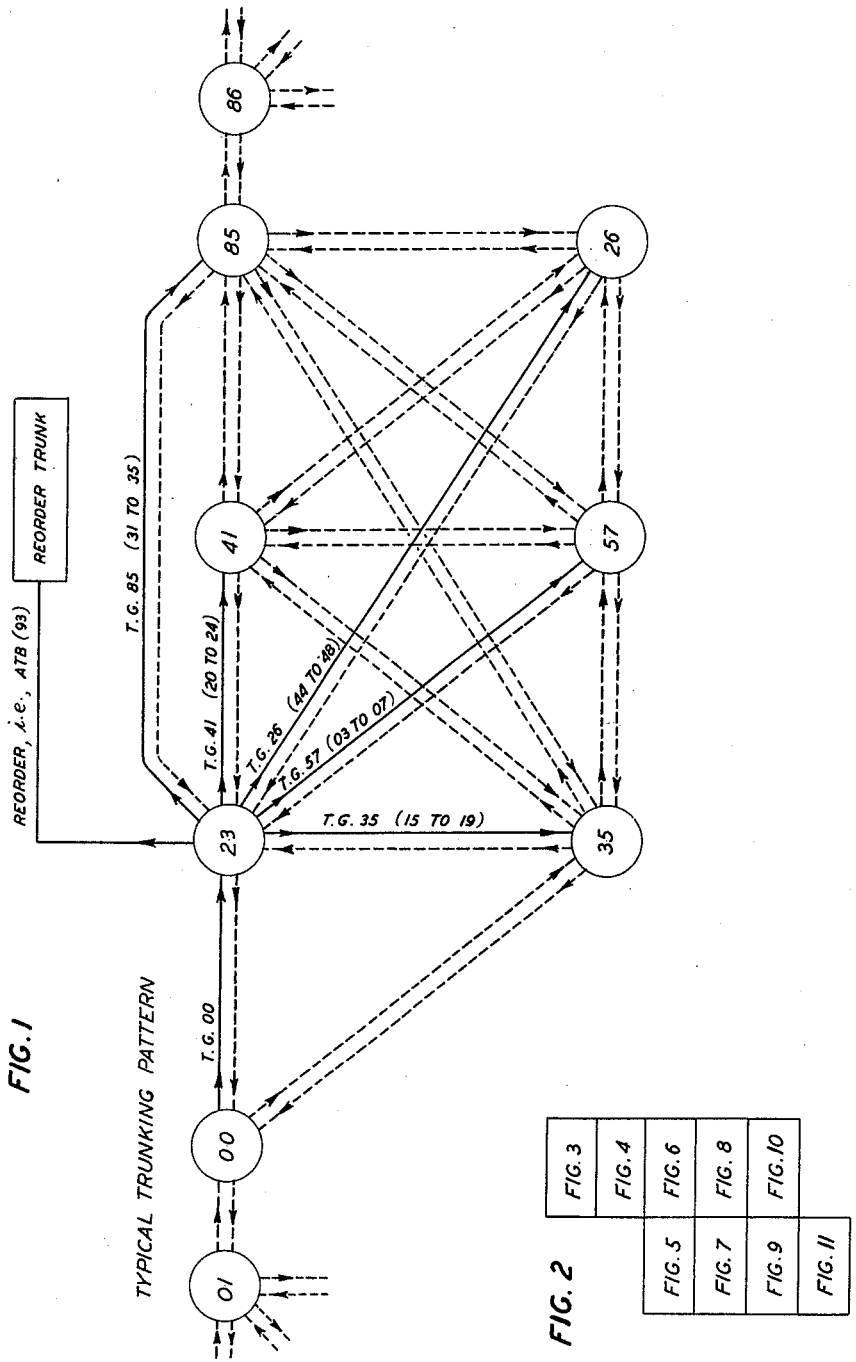

ALTERNATE ROUTE TRUNK SELECTION

Filed March 28, 1961      12 Sheets-Sheet 3

FIG. 4

INVENTOR
A. ZAROUNI
BY
*SnTurner*
ATTORNEY

Nov. 3, 1964  A. ZAROUNI  3,155,775
ALTERNATE ROUTE TRUNK SELECTION
Filed March 28, 1961  12 Sheets-Sheet 5

INVENTOR
A. ZAROUNI
BY
*S. H. Turner*
ATTORNEY

Nov. 3, 1964          A. ZAROUNI          3,155,775
ALTERNATE ROUTE TRUNK SELECTION
Filed March 28, 1961          12 Sheets-Sheet 11
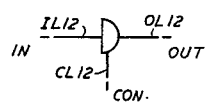
FIG. 12A
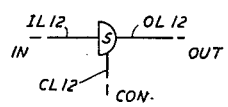
FIG. 12B
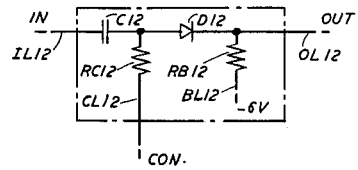
FIG. 12C
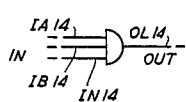
FIG. 14A
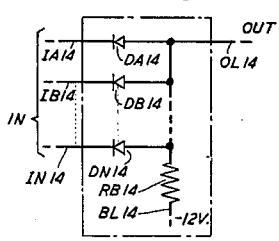
FIG. 14B
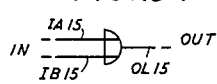
FIG. 13A
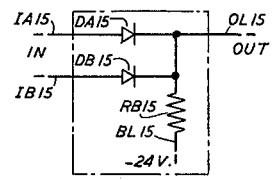
FIG. 13B
FIG. 15B
FIG. 15A
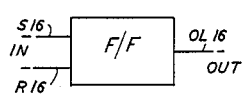
FIG. 16A
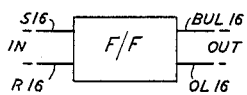
FIG. 16B
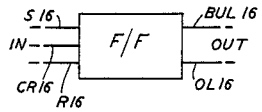
FIG. 16C
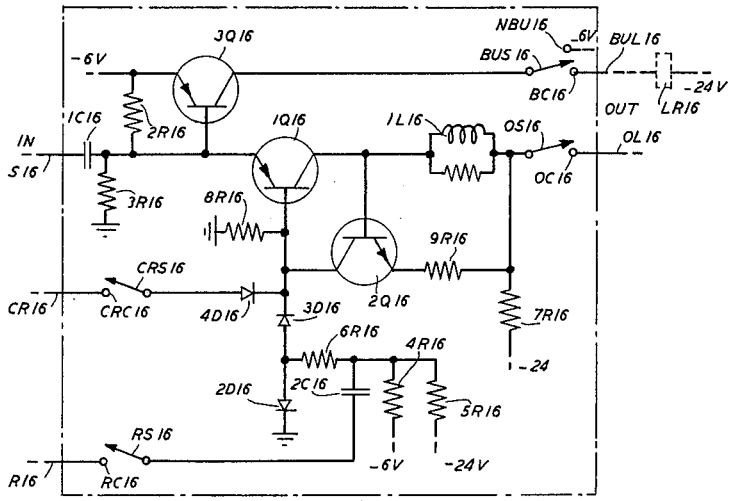
FIG. 16D
INVENTOR
A. ZAROUNI
BY
ATTORNEY Nov. 3, 1964  A. ZAROUNI  3,155,775
ALTERNATE ROUTE TRUNK SELECTION
Filed March 28, 1961  12 Sheets-Sheet 12

INVENTOR
A. ZAROUNI
BY
*SrTurner*
ATTORNEY

United States Patent Office 3,155,775
Patented Nov. 3, 1964

1

3,155,775
ALTERNATE ROUTE TRUNK SELECTION
Alfred Zarouni, Brooklyn, N.Y., assignor to Bell Telephone Laboratories, Incorporated, New York, N.Y., a corporation of New York
Filed Mar. 28, 1961, Ser. No. 98,980
22 Claims. (Cl. 179—18)

This invention relates generally to communications switching systems, and particularly relates to trunk seeking facilities in such systems, and more particularly relates to such systems wherein an idle trunk is sought among the trunks of a plurality of trunk groups, and even more particularly relates to such systems wherein the trunk groups may be successively scanned in accordance with a prescribed order of trunk group usage preference to ascertain if there is at least one idle trunk in a trunk group, whereby alternate trunk group routing is provided, and more especially relates to such systems wherein busy-trunk-group "camp-on" or monitoring is provided.

This invention particularly relates to automatic switching circuitry for communications systems wherein received code data manifestations are employed to control the seeking of an idle trunk among a plurality of alternatively usable trunk groups, where the identity of each trunk group in which all trunks are busy is "remembered", and where under an all-trunk-groups-busy condition each such busy trunk group is "camped-on" or monitored to detect the subsequent "idling" or availability of a trunk or trunks in the group or groups, and more particularly to such camp-on arrangements as are controlled by particular code data manifestations accompanying or associated with a received priority message.

The particular embodiment of the invention, as hereinafter shown and described, relates to new and novel automatic switching circuitry for communication systems, and particularly to those systems which are provided with a plurality of trunk groups progressively usable, in accordance with a prescribed route advance pattern corresponding to received address code data manifestations, to afford alternative access paths to a required destination, and in which particular systems are provided means associated with each such trunk group for indicating when all of the trunks in that trunk group are busy, means for testing all of the trunk groups to seek a trunk group wherein not all of the trunks are busy, means operative incident to the detection of a trunk group wherein not all of the trunks are busy for hunting among the trunks of that group for an idle trunk to serve an incoming message, means operative incident to the detection of a trunk group wherein all of the trunks are busy for seeking a less-preferred alternative trunk group wherein not all of the trunks are busy, and means operative incident to the detection of a less-preferred alternative trunk group wherein not all of the trunks are busy for hunting among the trunks of the less-preferred alternative trunk group for an idle trunk to serve an incoming message.

The particular embodiment of the invention, as hereinafter shown and described, also provides means for the detection, reception, translation and utilization of code data manifestations for ascertaining whether or not an incoming message is entitled to priority service, and means operative incident to such priority message condition for controlling the trunk testing and trunk hunting circuitry to facilitate the rendering of such priority service. The invention further provides new and novel circuitry whereby, when a priority message is to be served, if all of the trunks are busy in a given trunk group, to advance the trunk group testing to a succeeding less-preferred alternative trunk group, to hunt among the trunks of the less-preferred trunk group for an idle trunk to serve the priority message, to "remember" the identity of each alternative trunk group wherein all of the trunks are busy, to detect when all of the trunk groups embraced in a particular route advance pattern indicate an all-trunks-in-group busy condition and incident to such condition to arrest the trunk seeking cycle, to "camp-on" or monitor each such trunk group wherein all of the trunks are busy, thereby to detect when any busy trunk in any trunk group of a particular route advance pattern shall become idle, and when any trunk in any such trunk group becomes idle, to again seek a trunk group wherein not all of the trunks are busy to serve the incoming priority message.

An object of the present invention is to provide, in a communications switching system, improved and more rapid trunk seeking circuitry for successively and progressively testing a plurality of alternatively usable trunk groups embraced in a given alternate route advance pattern as specified by a received destination code, for detecting a trunk group in said pattern having at least one idle trunk therein, for hunting for an idle trunk in a trunk group in said pattern having at least one idle trunk therein, and when a given trunk group in said pattern has no idle trunk therein, for advancing the route advance circuitry to detect a less-preferred trunk group in the route advance pattern and having at least one idle trunk therein.

Accordingly, a feature of the present invention is a plurality of trunk groups constituting an alternate route advance pattern selectable in accordance with registered route codes, and trunk-group-use-status indicating means individual to each such trunk group and controlled by the use-status of the trunks thereof for indicating whether or not at least one of the trunks in the trunk group is idle.

Still another feature of the invention is an alternate route advance test circuit controlled by the registered route codes, for successively and progressively testing, in a prescribed order, among the trunk-group-use status indicating means to detect the first trunk group embraced in a route advance pattern in which there is at least one idle trunk.

Still another feature of the invention is a trunk hunting circuit, selectively operable under the control of the route advance test circuit to hunt for an idle trunk in that trunk group whose indicating means is the first to indicate the presence of at least one idle trunk therein.

Still another feature of the invention, and closely allied to the foregoing, is the embodiment in a trunk-group-use-status indicating means of a signal device for producing two characterizing signals respectively indicative of whether all of the trunks in the corresponding trunk group are busy or whether there is at least one idle trunk in the corresponding trunk group.

Still another feature of the invention, and operatively related to the preceding feature, is the inclusion in the alternate route advance test circuit of a start-stop sensing circuit, started under the control of registered route codes, to successively discriminate between the two signals produced by each of a series of trunk-group-use-status indicating means, and stopped under the control of the first of the trunk-group-use-status indicating means of said series which shall produce a signal indicative that there is at least one idle trunk in the trunk group associated therewith.

Still another feature of the invention, and closely related to the foregoing, is the provision in the trunk hunting circuit of trunk group selecting means controlled by the stopping of the start-stop signal sensing circuit, to trunk-hunt in the indicated trunk group.

Still another feature of the invention, and closely allied to the preceding features, is the incorporation in an alternate route advance test circuit of an operable test device for each trunk group embraced in a route advance pattern and of circuitry controlled in accordance with a registered route code for operating a preferred one of the test devices and for rendering operable other less-preferred test devices and the incorporation in said alternate route advance test circuit of route advance stepping means jointly controlled by an operated one of said test devices and by an all-trunks-in-group-busy signal from the trunk-group-use-status indicating means associated with the same trunk group for operating a succeeding test device representing a less-preferred trunk group and for releasing said previously operated test device.

Still another feature of the invention is the inclusion in a trunk group selecting means of a time-interval-controlled means for permitting the starting of trunk hunting within a particular trunk group only when the time interval between the operation of one trunk group test device and the subsequent release thereof is equal to or greater than a prescribed duration.

Still another feature of the invention is a trunk-designating means operable under the control of an operated trunk hunting circuit incident to the finding of an idle trunk thereby to designate the idle trunk to serve an incoming message, and to release the operated trunk group testing and hunting circuitry.

Still another feature of the invention, and operatively related to the preceding features, is the provision in an alternate route advance test circuit of control circuitry normally operable incident to the occurrence of an all-trunk-groups-busy condition, to designate a suitable signal trunk (e.g., a reorder trunk) for interconnection to an incoming line whereby to apprise the incoming line of the existence of an all-trunk-groups-busy condition, and to release the operated trunk group testing and hunting circuitry.

Another object of the invention is to assure, in a communications switching system, that a facility serving an incoming "priority" message shall have preferential access to outgoing trunks, and to do so by permitting the facility to unremittingly seek the services of an idle outgoing trunk despite the occurrence of an all-trunk-groups-busy condition.

Accordingly, still another feature of the invention is route advance memory circuitry, operable auxiliary to the operation of the route advance test circuit, for remembering the identity of each corresponding alternate route trunk group wherein an idle trunk was sought to serve a priority message.

Still another feature of the invention, and operatively related to the preceding feature, is means effective incident to the detection of an incoming message-accompanying priority signal to cause the auxiliary route advance memory circuit to operate.

Still another feature of the invention, and operatively related to the foregoing features, is the embodiment in an alternative route advance test circuit of control circuitry, operative incident to the detection of a message-accompanying priority signal, to inhibit the normal mode of operation of the route advance test circuitry and to effect a "priority" mode of operation thereof, whereby the route advance test circuit unremittingly seeks the services of an idle outgoing trunk despite the occurrence of an all-trunk-groups-busy condition.

Still another feature of the invention, and closely related to the foregoing features, is the incorporation in the auxiliary route advance memory circuit of trunk group monitoring means, operable incident to the detection of a message-accompanying priority signal and to the occurrence of an all-trunk-groups-busy condition, to cause the said auxiliary route advance memory circuit to "camp-on" or keep under surveillance all of the corresponding alternate route trunk groups wherein an idle trunk was sought to serve said priority message.

Still another feature of the invention, and operatively related to the immediately preceding feature, is the embodiment in the auxiliary route advance memory circuit of control means, operable incident to the transition from a busy condition to an idle condition of any trunk in any monitored trunk group, to reinitiate, under the control of the previously registered code and priority index, the entire trunk seeking operation, whereby an idle trunk will be sought in that trunk group whose busy-idle indicating device is the first in an alternate trunk group route advance sequence to indicate the preference of at least one idle trunk therein.

Another feature of the invention, and of significance with respect to the foregoing features, is that the auxiliary route advance memory circuit is provided with a trunk group memory device which is functionally a counterpart of a corresponding trunk group testing device provided in the route advance test circuit; and as a consequence therefore, under a priority condition, the operation of any testing device of the route advance test circuit is reflected in the concomitant operation of a corresponding memory device of the auxiliary route advance memory circuit.

The foregoing objects and features of the invention, and others that will be apparent to one skilled in the art, may be readily understood by reference to the following detailed description of an exemplary embodiment thereof as delineated in the drawings wherein:

FIG. 1 is a diagrammatical representation of a typical trunking pattern;

FIG. 2 shows the pattern for arranging FIGS. 3 through 11 to represent an exemplary disclosure of the invention;

Figure 3:
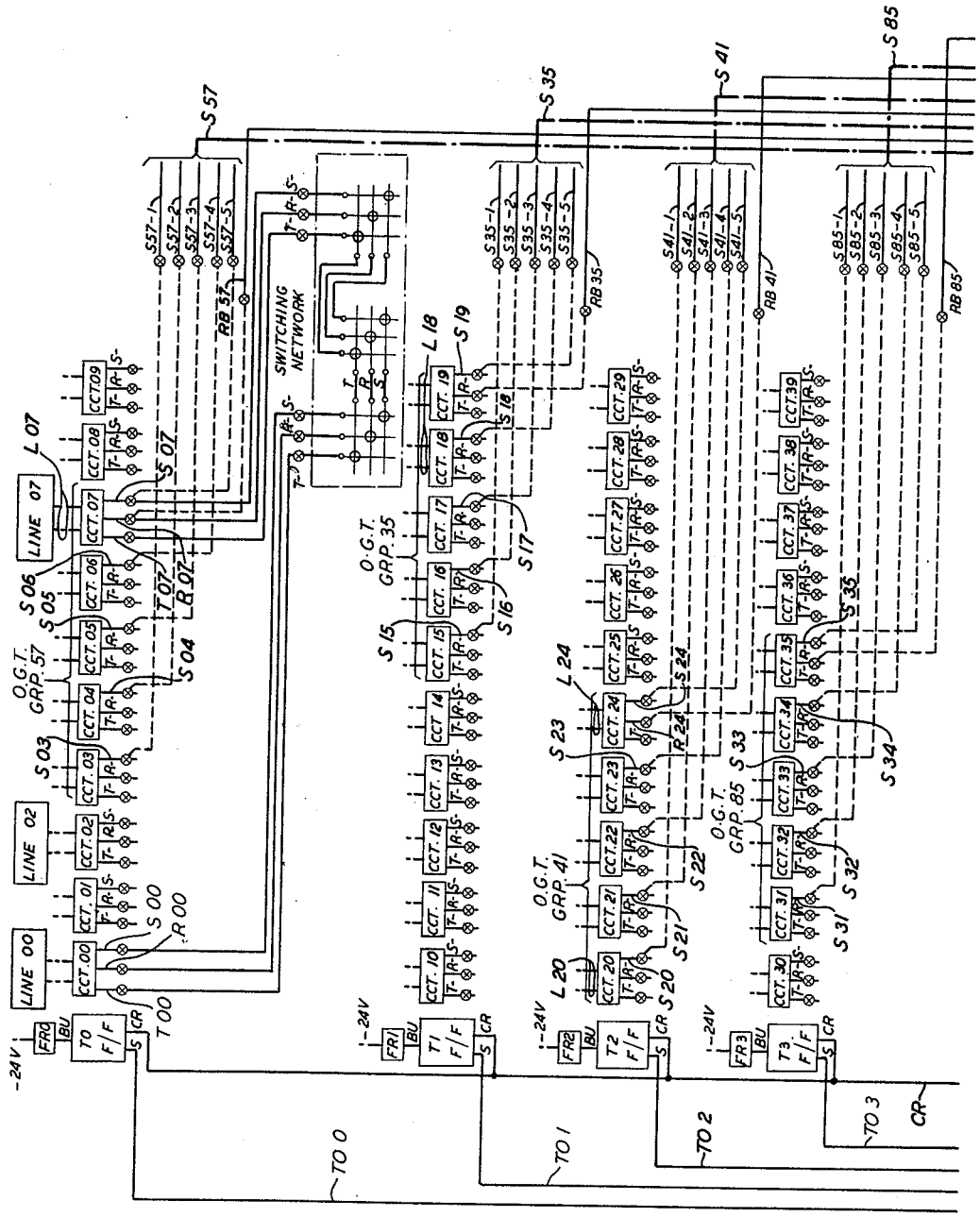
Figure 5:
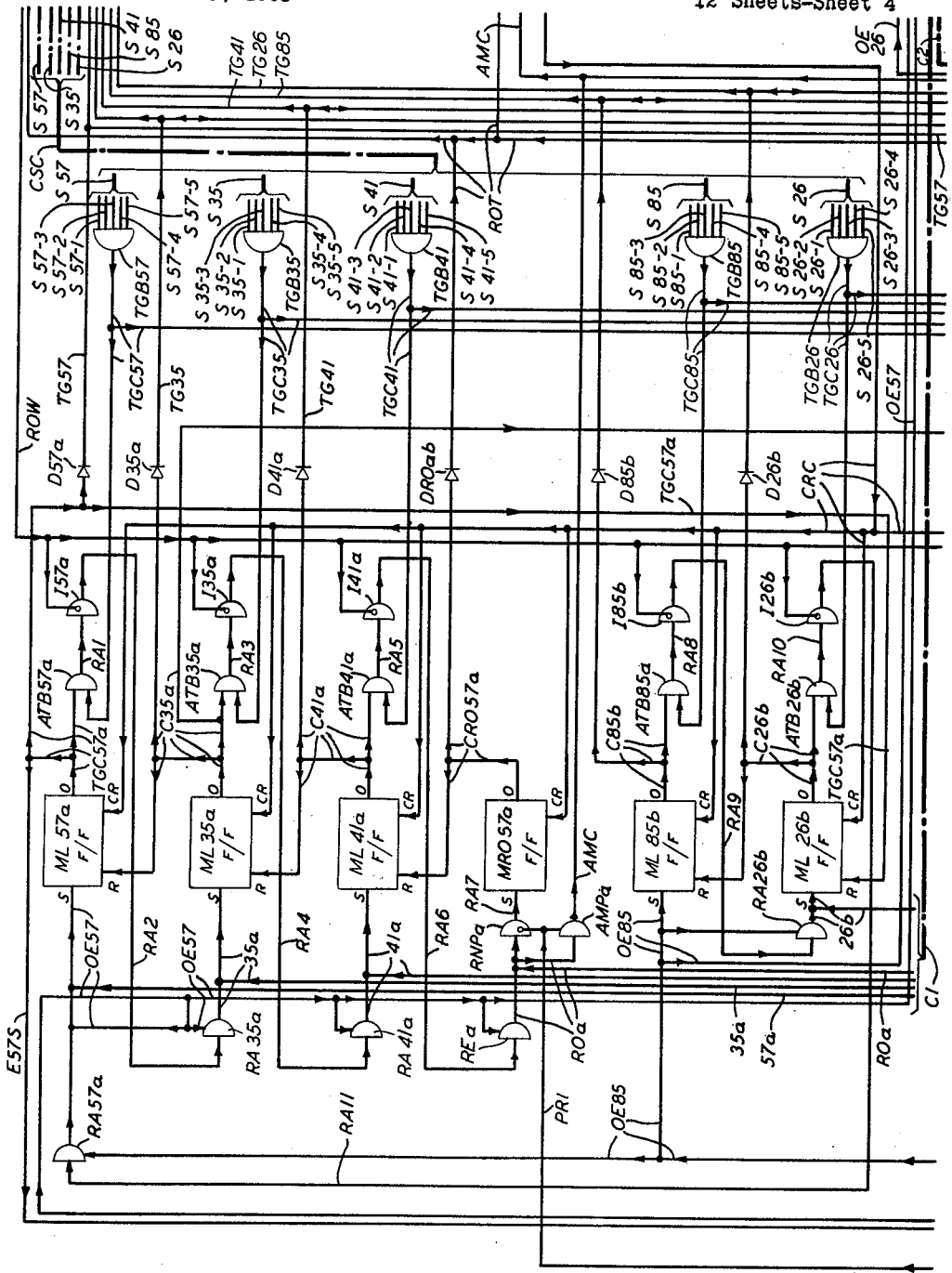
Figure 6:
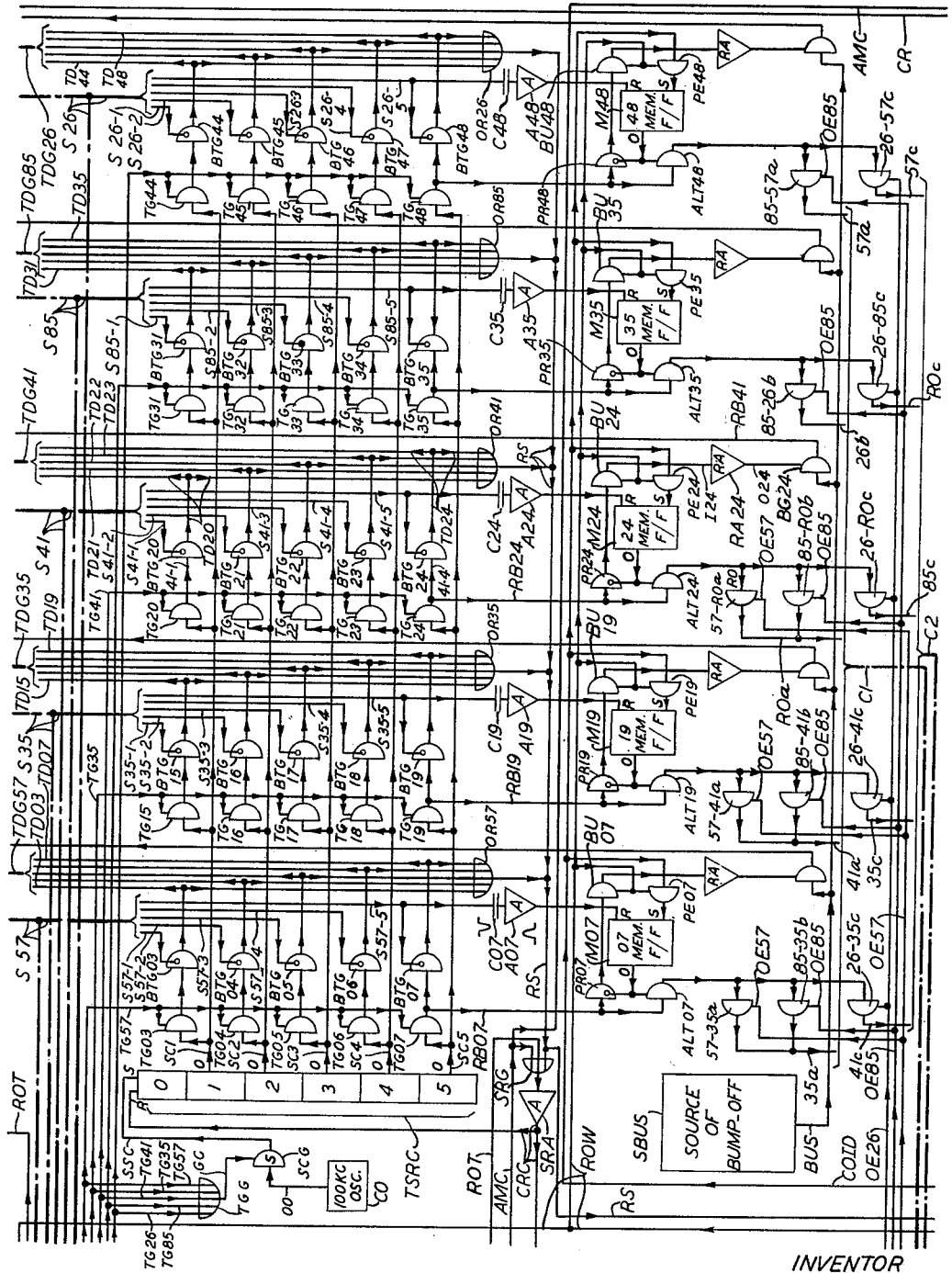
Figure 7:
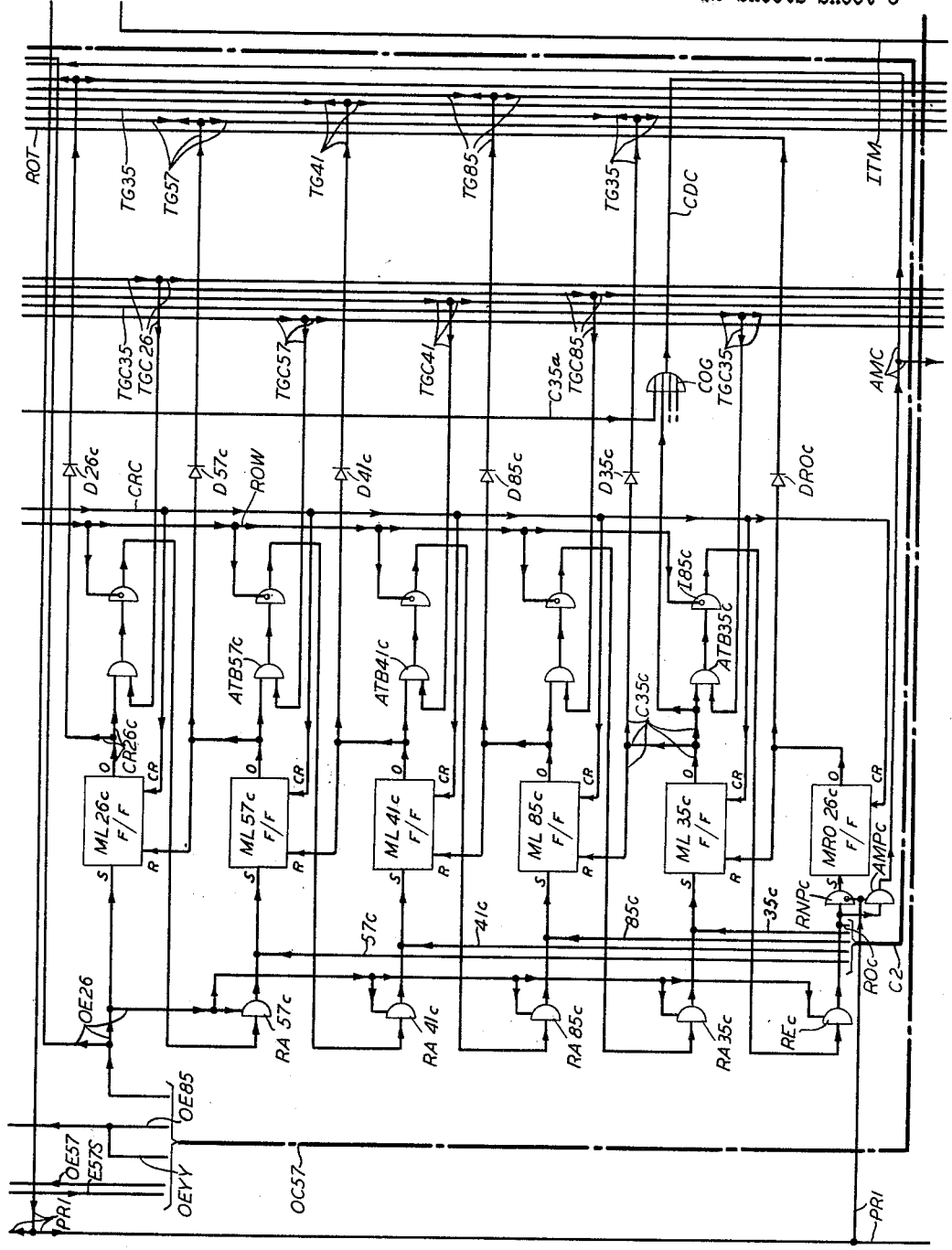
Figure 8:
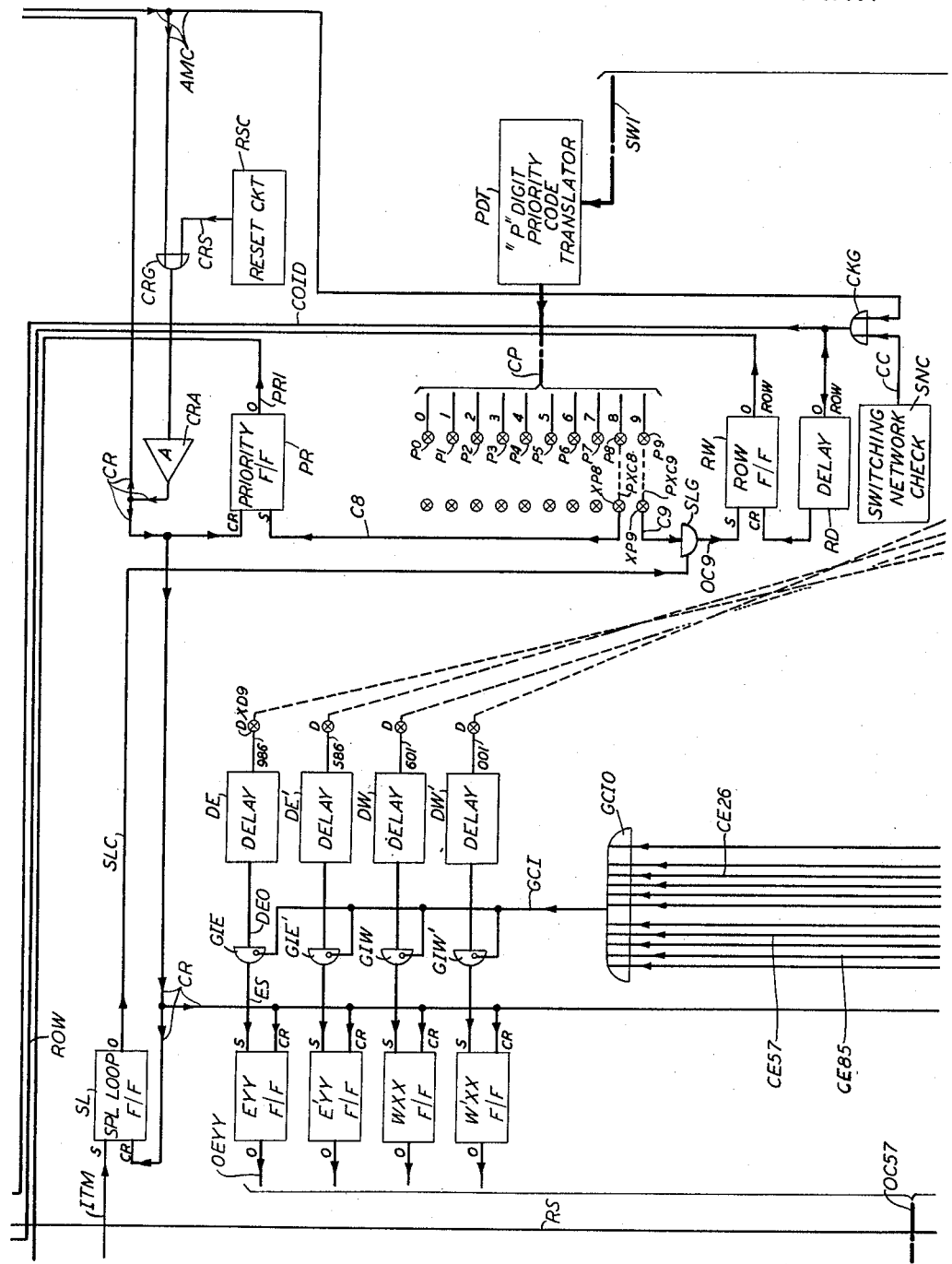
Figure 9:
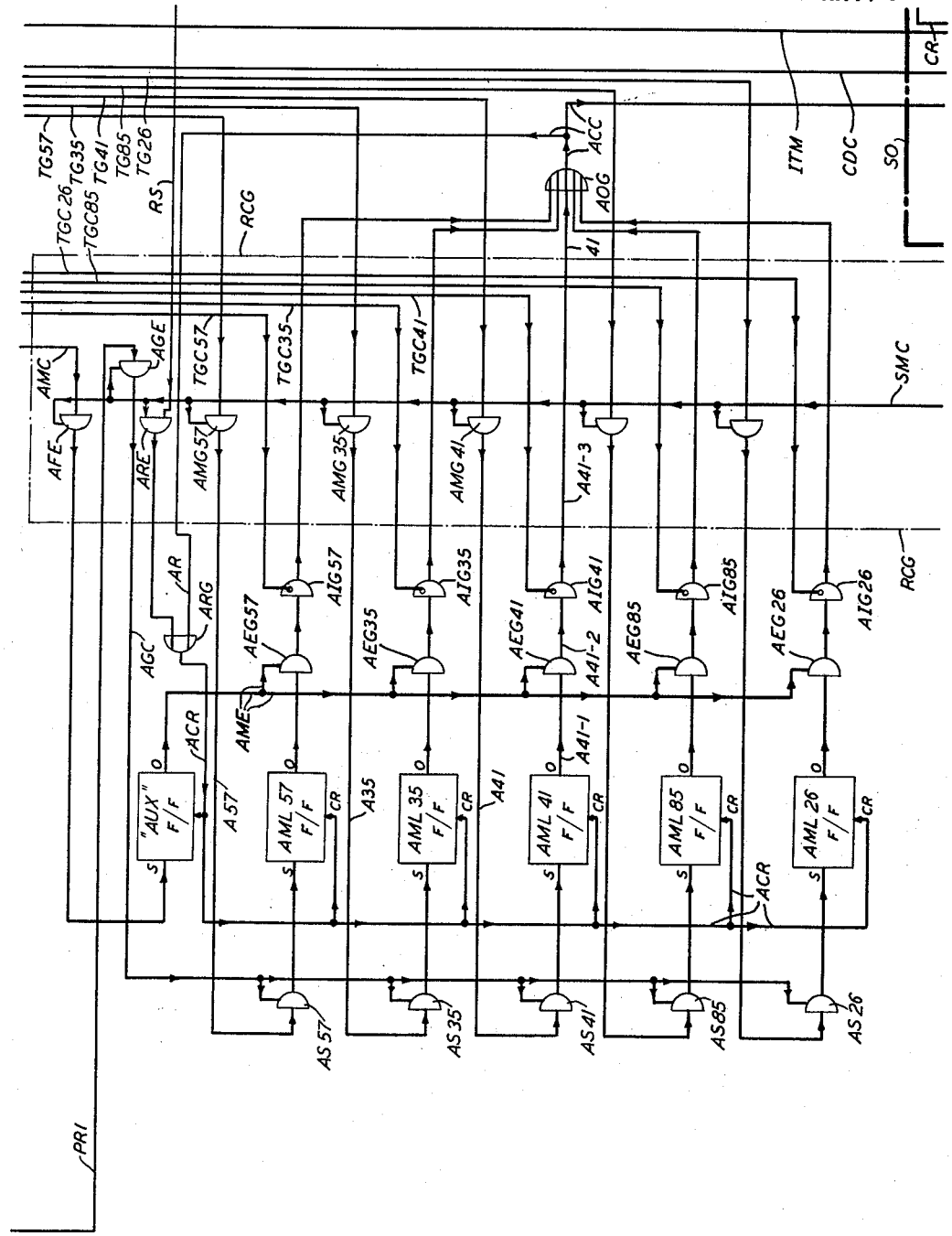
Figure 10:
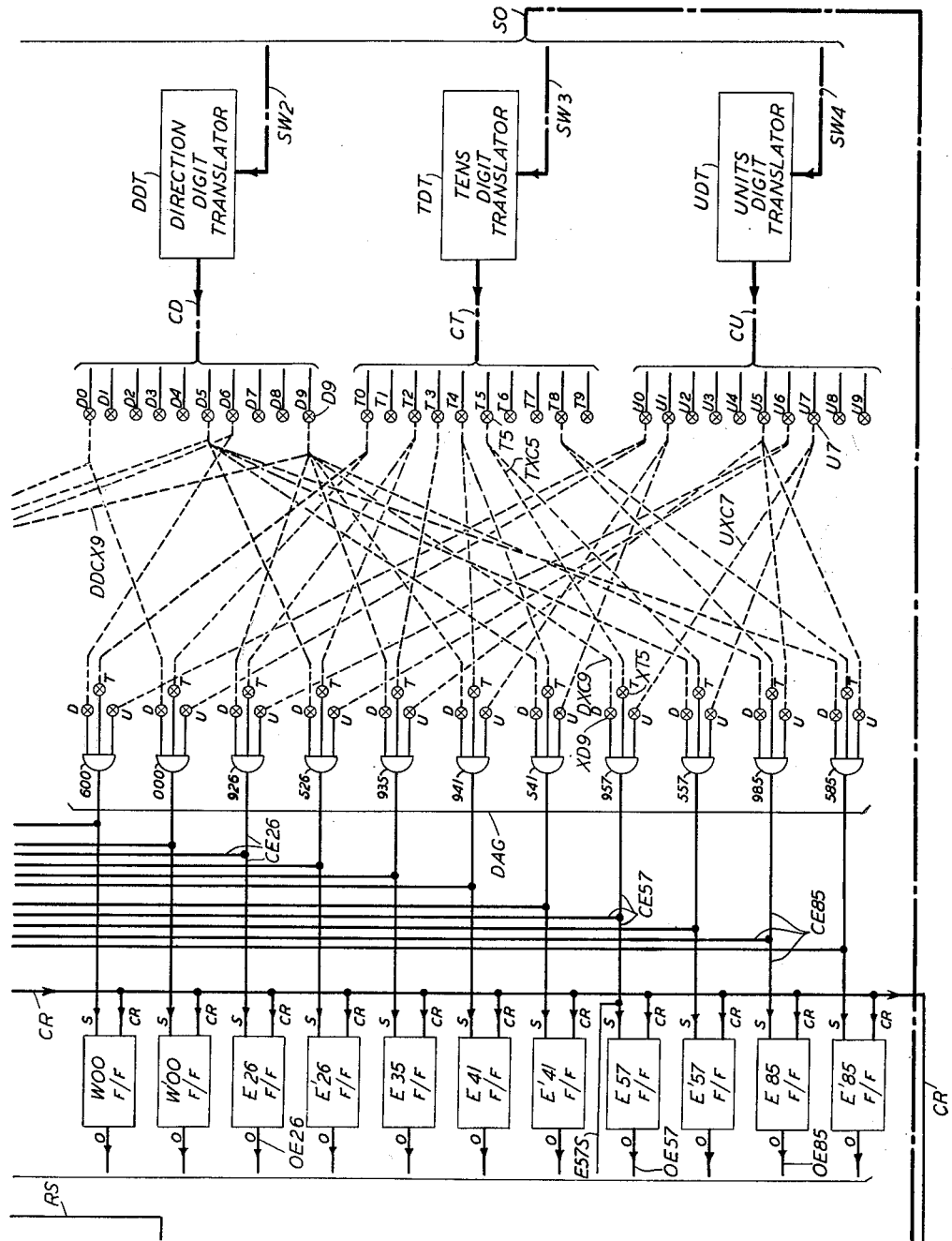
Figure 11:
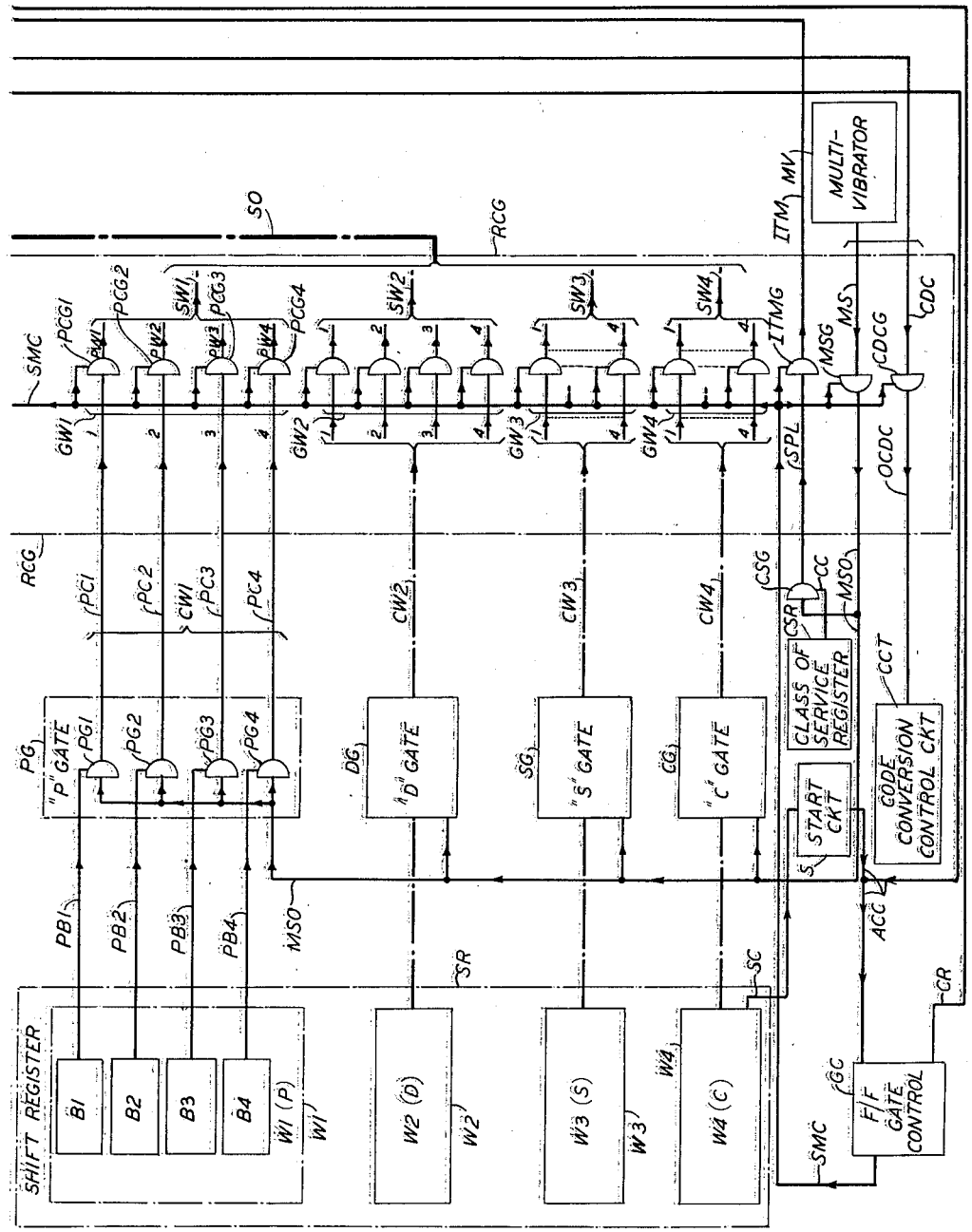

FIGS. 3 and 4 diagrammatically show a plurality of line or trunk terminating circuits and means for designating certain of the lines or trunks for interconection; and FIG. 3 also shows, in diagrammatical form, the rudiments of a switching network;

FIGS. 5 through 11, in general, show circuitry of those portions of a switching system such as embodied in the exemplary disclosure of the instant invention, and in sufficient detail to enable one skilled in the art to understand the manner in which the received address or destination codes are registered, translated and utilized to find or procure an idle trunk affording access to said destination and to designate said trunk for interconnection, and more specifically;

FIGS. 5 and 7 show circuitry for route advancing, thereby to progressively designate optional trunk groups affording access to the destination via a first, second or subsequent choice trunk group;

FIG. 6 shows circuitry for successively trunk hunting through a plurality of optional trunk groups;

FIGS. 8 and 10 show circuitry for translating and re-registering coded data;

FIG. 9 shows circuitry for auxiliary route advance memory registration;

FIG. 11 shows circuitry for registering address codes and other pertinent data; and FIGS. 12A through 18B show the several symbols employed in the detailed disclosure of FIGS. 3 through 11 and typical equivalent circuitry respectively corresponding to the symbols.

GENERAL DESCRIPTION OF SYSTEM

This description is related to FIG. 1 wherein is shown a typical trunking pattern for interconnecting a plurality of switching centers. An exemplary disclosure of the circuitry of one of such switching centers is shown in considerable detail in FIGS. 3 through 11, a detailed description of which switching center is provided hereinafter. Each such switching center is represented by a numbered circle (e.g., 23). Trunk groups are represented by solid lines (e.g., T.G. 41) and afford means whereby a connection may be extended from one switching center to another switching center. Other assumed trunk groups are indicated by dotted lines. Arrows indicate the direction of traffic flow. The numbers of the trunks in a particular group are indicated by the numbers enclosed in parentheses (e.g., 20 to 24), which numbers correspond to the numbers of the terminating circuits in the detailed exemplary disclosure (FIGS. 3 and 4).

The illustrated typical trunking pattern is specifically applicable to the exemplary circuit arrangement shown in FIGS. 3 through 11 wherein is shown the circuitry of the instant switching center, represented by the encircled number 23. In a sense, in the instant disclosure, switching center 23 may be considered as the "hub" of a switching system, and the other switching centers may be considered as satellites thereof. In the same sense, other trunking patterns may be envisaged wherein any different switching center may be considered as the hub, and the other switching centers may be considered as satellites thereof.

Simply stated, with reference to the switching center 23, for example, a specific destination code received thereat will specify the switching center to which connection is desired. Let it be assumed, for example, that the received specific destination code has associated therewith a signal indicative of an ordinary or low degree of priority known as, and hereinafter referred to as, a "no priority" (NP) signal. Under control of the received destination code, trunk selecting equipment (not shown in FIG. 1) will, as a first choice, seek that trunk group which affords the most direct access to the switching center of destination, and in that trunk group will seek an idle trunk. If all of the trunks in the first choice trunk group are busy, the trunk selecting equipment will route-advance to seek, as a second choice, an alternative trunk group which affords access to some other switching center which, in turn, may have a trunk group affording access therefrom to the switching center of destination. If all of the trunks in the alternative group are busy, the trunk selecting equipment will again route-advance, and an idle trunk will be sought in a third choice trunk group. In this manner, the trunk selecting equipment will be successively route advanced to test in successive trunk group choices to different switching centers. The test will be continued until a trunk group having an idle trunk therein has been found, or until the trunk selecting equipment has ascertained that no such trunk group has an idle trunk therein. If no idle trunk is available, the trunk selecting equipment will route-advance to connect to a "recorder" trunk, e.g., 93 (FIG. 1), thereby giving a signal to the calling line that all trunks are busy.

Now let it be assumed, as an alternative example, that the received specific destination code has associated therewith a signal indicative of a high degree of priority known as, and hereinafter referred to as, a "right-of-way" (ROW) or pre-empt signal. Upon receipt of such a right-of-way signal, equipment (not shown in FIG. 1) responds to this signal and to the specific destination code to cause, as a first choice, an idle trunk to be sought in that trunk group which affords the most direct access to the switching center of destination. If all of the trunks in that trunk group are busy, the trunk hunting circuitry ascertains whether the last trunk in the group is serving a low-priority call (any priority less than ROW) or a right-of-way call. If the call being served is of low priority, the call is deprived of further use of the said last trunk (i.e., "bumped-off") by applying thereto a disconnect signal, and the incoming right-of-way call pre-empts the use of the trunk and causes it to be designated for connection upon its becoming idle as a result of the disconnect signal. If the call being served by the last trunk of the first choice trunk group is also a right-of-way call, the trunk selecting equipment will route-advance, in the manner above described, to seek, as a second choice an alternative trunk group and an idle trunk therein. If, during the progress of the route advance circuitry, all of the trunks are busy and the last trunks in all of the successively tested trunk groups are also serving right-of-way calls, the trunk selecting equipment will route-advance, as above described, to connect to a "reorder" trunk, e.g., 93, thereby giving a signal to the calling line that no trunk is available. It must be realized, of course, that the situation just described represents an extreme condition—in fact the worst condition—that could conceivably be encountered, for under actual traffic conditions it would be extremely seldom, if ever, that all of the trunks in all of the groups would be busy and that the last trunks in all of the groups would be engaged in serving right-of-way calls.

Now let it be further assumed, as another alternative example, that the received specific destination code has associated therewith a signal indicative of a limited degree of priority known as, and hereinafter referred to as, a "priority" (P) signal. Upon receipt of such a priority signal, equipment (not shown in FIG. 1) responds to the signal and to the specific destination code to cause, as a first choice, an idle trunk to be sought in that trunk group which affords the most direct access to the switching center of destination. At the same time that the trunk selecting equipment starts to seek an idle trunk in the first choice trunk group, auxiliary registering means (not shown in FIG. 1) is operated under the control of the "priority" signal to register therein the "memory" that a certain first choice trunk group has been tested to ascertain the availability of an idle trunk therein. If all of the trunks in the first choice trunk group are busy, the trunk selecting equipment will route-advance, as previously described, to seek as a second choice an alternative trunk group and an idle trunk therein. Again, at the same time that the trunk selecting equipment starts to seek an idle trunk in the second choice trunk group the auxiliary registering means is again operated, to register therein the "memory" that a certain second choice trunk group has been tested for the availability of an idle trunk. If all of the trunks in the second choice trunk group are busy, the trunk selecting equipment will again route-advance. In like manner, successive trunk groups will be tested and their respective identities "remembered." The testing of trunk groups will be continued until a trunk group having an idle trunk therein has been found, or until the trunk selecting equipment has ascertained that no trunk group in that particular route advance pattern has an idle trunk therein. Under the instant or "priority" condition, if no idle trunk is available within the route advance pattern, instead of route advancing to a reorder trunk, as previously described with reference to the "nonpriority" and "right-of-way" calls, the trunk selecting circuitry will be released and restored to its normal condition; and the auxiliary registering or "memory" equipment will monitor the trunk groups to detect when an idle trunk therein shall have become available, and will then cause the above-described trunk hunting cycle and route advance pattern, if required, to be repeated.

The table which follows is provided in order to facilitate an understanding of the relationship between the switching center called for by the specific address code received at switching center 23 (FIG. 1) and the trunk group or groups ultimately employed in gaining access to said destination, and is illustrative of the route advance pattern inherent in the circuitry of the exemplary embodiment of the invention as shown in FIGS. 3 through 11.

| Column 1 | Col. 2 | Col. 3 | Col. 4 | Col. 5 | Col. 6 | Col. 7 |
|---|---|---|---|---|---|---|
| Code Calls For Switching Center Destination | Trunk-Group | | | Route-Advance Pattern | | |
| | Choice 1 | Choice 2 | Choice 3 | Choice 4 | Choice 5 | Choice 6 |
| 57 | 57 | 35 | 41 | RO | ------ | ------ |
| 85 | 85 | 26 | 57 | 35 | 41 | RO |
| 26 | 26 | 57 | 41 | 85 | 35 | RO |
| 35 | 35 | RO | ------ | ------ | ------ | ------ |

As a first example, let it be assumed that the specific address code received at switching center 23 calls for a trunk path affording access to switching center 57 as the switching center of destination, as indicated in Column 1. Obviously, the first choice of a path to said destination is a direct route to switching center 57, as indicated in Column 2, via one of the five trunks (03 to 07) in trunk group 57. If all of the trunks in trunk group 57 are busy, the second choice is an indirect route, via one of the five trunks (15 to 19) in trunk group 35, as indicated in Column 3, to switching center 35, and thence to switching center 57 via one of the trunk groups extending therefrom (represented by dotted lines) by means of which access may be had, directly or indirectly, to switching center 57, as directed by the route advance pattern inherent in the circuitry of switching center 35. If at this time, or in any subsequently discussed route advance pattern, the group of trunks from switching center 23 to switching center 35 is to be used as an alternate route, a change of direction will be required, and, hence, code conversion will be called for, the reason for which will be explained later. If all of the trunks in trunk group 35 are busy, the third choice is an indirect route, via one of the five trunks (20 to 24) in trunk group 41, as indicated in Column 4, to switching center 41, and thence to switching center 57 via one of the trunk groups extending therefrom (represented by dotted lines) by means of which access may be had to switching center 57, as directed by the route advance pattern inherent in the circuitry of switching center 41. If all of the trunks in trunk group 41 are busy, there are no other allocated trunk groups in which to seek an idle trunk. Therefore, under this condition, as a fourth and last choice, the trunk selecting equipment will route-advance to connect to a reorder trunk (e.g., 93), as indicated in Column 5, thereby giving a signal to the calling line that all trunks are busy.

As a second example, let it be assumed that the specific address code received at switching center 23 calls for a trunk path affording access to switching center 85 as the switching center of destination, as indicated in Column 1. The several choices are respectively indicated in Columns 2 through 7. The equipment will function in the manner above described with reference to Example 1, and if no trunks are available in any of the groups will route-advance to connect to a reorder trunk.

Example 3, wherein switching center 26 is the specified destination, will result in operations similar to those described with reference to Examples 2 and 3.

Example 4, however, presents a somewhat different condition. In this case switching center 35 is the specified destination, as indicated in Column 1. The first choice is the direct route to switching center 35, as indicated in Column 2. The second choice is to a reorder trunk, as indicated in Column 3. The reason for this absence of alternate choices of trunk groups is that any alternate trunk routing would entail a reversal of direction, and would be contrary to the principles on which the operation of the circuitry is predicated. The operation of the route advance and trunk selecting circuitry will be more specifically discussed in the detailed circuit description which will follow.

General Codes

In the foregoing descritpion, only "specific" codes have been discussed, i.e., codes calling for a specific switching center destination. Each of the switching center codes discussed in the foregoing description, it must be remembered, comprises four significant digits; the first of which digits is indicative of the degree of priority to be accorded to the message; the second of which digits is indicative of the direction in which the message is to be advanced toward its switching center destination; and the third and fourth of which digits are jointly indicative of a remote switching center of destination. The first (or priority) digit and the circuitry controlled thereby will be specifically discussed in the detailed circuit description which will follow.

For certain traffic situations, "general codes" will be employed. Such general codes will, as received, as in the case of "specific codes," comprise four significant digits, but only the second or "directional" digit will exercise any control over the route advance and trunk selecting circuitry of the local switching center (e.g., 23, FIG. 1). The directional digit alone, in this instance, will be used to control the starting of the operation of any desired route advance pattern which affords either direct or indirect access to the remote switching center (e.g., 86, FIG. 1); and, at the remote switching center the third and fourth digits may jointly be employed as a specific code to obtain either direct or indirect access to another switching center.

Symbols and Equivalent Circuitry

This description is confined to FIGS. 12A through 18B in which are shown the several symbols employed throughout the detailed disclosure of FIGS. 3 to 11, inclusive, and the equivalent circuitry respectively corresponding to the symbols.

The Transmission Gate

FIGS. 12A and 12B illustrate symbols for transmission enabling gates with respect to which the equivalent circuitry is shown in FIG. 12C. With —24 volts (all potentials are assumed to be with respect to ground potential) on the control lead CL12, the transmission gate is nonconductive so as to inhibit a positive-going pulse on input lead IL12 of up to 18 volts amplitude; and, with the control lead CL12 at —8 volts the gate is in a conducting condition so as to permit a positive-going input pulse in excess of 2 volts, say 16 volts, for example, to be transmitted therethrough to the output lead OL12. The gate shown in FIG. 12B is a slow-acting gate employing the same circuit configuration as for FIG. 12A and wherein the slow-acting characteristic of the gate is obtained by suitably increasing the value of capacitor C12 to afford any desired increased values of delay.

The Inhibiting Gate

FIG. 13A shows the symbol for an inhibiting gate with respect to which the equivalent circuitry is shown in FIG. 13B. This gate is normally conductive for a positive-going input pulse in excess of 2 volts, say 16 volts, for example, on lead IL13 when the control lead CL13 has —24 volts applied thereto, but will inhibit the transmission of such a positive-going input pulse when the control lead CL13 has —8 volts applied thereto.

The "AND" Gate

FIG. 14A shows the symbol for an "AND" gate with respect to which the equivalent circuitry is shown in FIG. 14B. The input leads IA14, IB14 through IN14 are adapted to have applied thereto, for example, either —24 volts or —8 volts. With —24 volts applied to all of the inputs the output lead OL14 will be at substantially —24 volts. If any less than all of the input leads have —8 volts input, the output lead OL14 will remain at —24 volts. It is only when all of the input leads are raised to —8 volts that the output lead OL14 changes its potential from —24 volts to —12 volts.

The "OR" Gate

FIG. 15A shows the symbol for a typical "OR" gate with respect to which the equivalent circuitry is shown in FIG. 15B. With —24 volts, for example, on each of the input leads the output lead OL15 will assume a potential of substantially —24 volts. Whereas, if any one or more of the input leads is adjusted to a potential of —8 volts, for example, the output lead OL15 will similarly assume —8 volts potential. It is, of course, to be understood that "OR" gates having a greater number of input leads than in the illustrated example will function in a manner similar to that above outlined.

The Flip-Flop

With reference to the symbols shown in FIGS. 16A, 16B, and 16C, and to the equivalent circuit therefor shown in FIG. 16D, flip-flops are shown wherein provisions are made for various input and output lead requirements; and wherein the setting of the switch or switches shown in FIG. 16D will adapt the flip-flop circuit to afford the connections specified in FIG. 16A, FIG. 16B, or FIG. 16C.

Circuit Condition—Re: FIG. 16A

With respect to FIG. 16A, which shows a "SET" lead S16, a "reset" lead R16, and an "OUTPUT" lead OL16, the circuit shown in FIG. 16D may be adapted to provide an equivalent circuit arrangement therefor by setting the wiper of reset switch RS16 on its contact RC16, by setting the wiper of output switch OS16 on its contact OC16, and by setting the wiper of buffer output switch BUS16 on its non-buffer contact NBU16 to provide a potential of —6 volts for the collector of transistor 3Q16. Common reset switch CRS16 will be open.

Circuit Condition—Re: FIG. 16B

With respect to FIG. 16B, which is similar to FIG. 16A, but which shows in addition a "buffer output" lead BUL16, the circuit in FIG. 16D may be adapted to provide an equivalent circuit for FIG. 16B by using the same switch settings as for FIG. 16A, except that the wiper of buffer output switch BUS16 will be set on its buffer contact BC16 to connect a potential of —24 volts, through the winding of load relay LR16 to transistor 3Q16.

Circuit Condition—Re: FIG. 16C

With respect to FIG. 16C, which is similar to FIG. 16B but which shows in addition a "common reset" lead CR16, the circuit shown in FIG. 16D may be adapted to provide an equivalent circuit for FIG. 16C by using the same switch settings as for FIG. 16B, except that the wiper of common reset switch CRS16 will be set on its contact CRC16.

Circuit Function—Re: FIG. 16A

Let it be assumed that the requirements of the circuit are such that a flip-flop of the type symbolized by FIG. 16A is to be employed. The flip-flop is essentially a bistable circuit which in its "off" condition (i.e., not set) causes a potential of —24 volts to appear on its output lead OL16, and which in its "on" condition (i.e., set) causes the potential on its output lead OL16 to change to —8 volts. A positive-going input signal, on input lead S16, in excess of about 6 volts will turn on the flip-flop. A positive-going "reset" signal having an amplitude in excess of 9 volts, if applied to the "reset" lead R16, will cause all of the transistors to become non-conducting, thus resetting the flip-flop back to its "normal" or "off" condition.

Circuit Functions—Re: FIG. 16B

If the requirements of the circuit are such that a flip-flop of the type symbolized by FIG. 16B is to be employed, the circuit operation will be substantially the same as previously described with reference to FIG. 16A with the exception that the buffer output transistor 3Q16 is used to control a load device. Under this condition, the wiper of switch BUS16 will be set on its contact BC16, thereby providing an additional "buffer" output lead BUL16 terminted in —24 volts through the winding of a relay or other suitable load device or circuit.

Circuit Function—Re: FIG. 16C

If a circuit of the type symbolized by FIG. 16C is to be employed, the flip-flop is of the same nature and operates in substantially the same manner as described with reference to FIG. 16B with the exception, however, that in a circuit per FIG. 16C, in addition to the regular reset lead R16, a second or "common reset" lead CR16 is used. Under this condition, the wiper of common reset switch CRS16 will be set on its contact CRC16. Under this condition, means is provided whereby when a plurality of flip-flops are used, a group comprising any desired number of such flip-flops may have their respective common reset leads connected together and in turn connected to a suitable source of resetting potential for simultaneously resetting the flip-flops of such group independently of their respective individual reset leads. A ground potential or positive pulse of suitable amplitude, if applied to the common reset lead CR16, will cause all of the transistors to become nonconductive, thus resetting the flip-flop back to its previously-described normal condition.

The Ring Counter

Figure 17A:
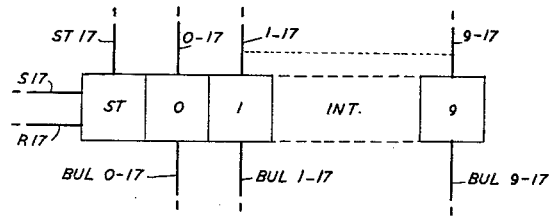
Figure 17B:
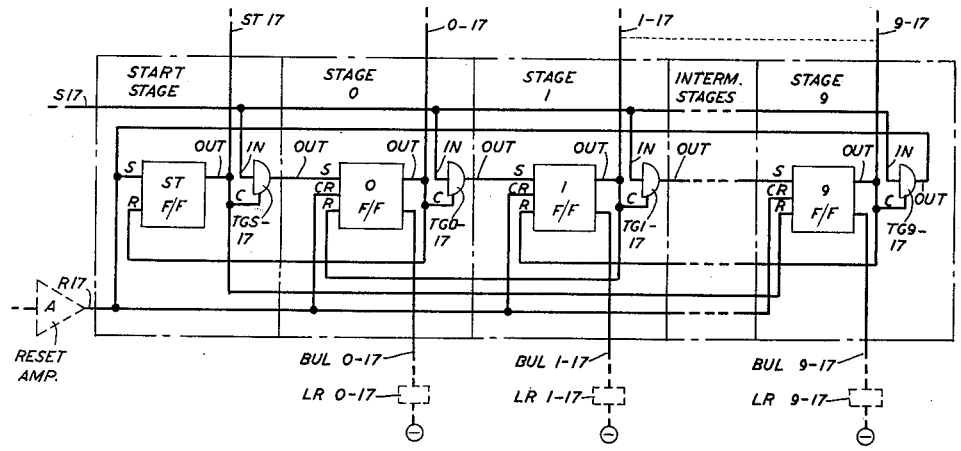

With reference to the symbol shown in FIG. 17A and to the symbolized circuitry shown in FIG. 17B, the inter-relationship is shown of a plurality of flip-flops coupled together by means of transmission gates to constitute a ring counter. The flip-flops are of the type such as shown in FIGS. 16A and 16C previously described. The transmission gates are of the type shown in FIG. 12A previously described.

Having in mind the preceding descriptive matter relating to the flip-flop circuits and to the transmission gate circuits, the descriptive material immediately following will be confined to the operation of the ring counter with reference to FIGS. 17A and 17B.

It is assumed that the ring counter is in its starting position represented by the flip-flop ST (first or "START" stage of the ring counter) being in its "SET" or "on" condition and all of the remaining flip-flop stages 0 through 9 being in their reset or "off" conditions. Under this condition, the output lead ST17 will be at a potential of approximately —8 volts, while each of the output leads 0–17 through 9–17 will be at potentials of approximately —24 volts. The transmission gate TGS–17 will be in a primed or enabled condition and all of the remaining transmission gates TG0–17 through TG9–17 will be in an inhibiting condition. If at this moment a positive-going input pulse in excess of 8 volts but less than 24 volts is applied to the set lead S17, such a pulse will be transmitted through gate TGS–17 to cause flip-flop 0 to be turned on, thereby changing the potential on output lead 0–17 from —24 to —8 volts, which primes or enables gate TG0-17 and resets flip-flop ST.

In a like manner, a succession of such positive-going pulses on lead S17 will cause successive flip-flops in the ring counter chain to be turned on and preceding ones to be turned off. With stage 9 of the ring counter turned on and all of the preceding stages turned off, upon the reception of the next positive input pulse on lead S17, the flip-flop ST will be turned on, thereby resetting flip-flop 9 to, in effect, recycle the ring counter. Although stages 0 through 9 of the ring counter have buffer outputs for controlling relays, such as LR 0-17 through LR 9–17 indicated in dotted lines, none of these relays will operate unless the ring counter stops for a substantial length of time in the corresponding position. The pulses supplied to the input lead S17 occur with such rapidity that any particular ring counter stage does not remain in its "on" condition long enough to cause the operation of its relay.

If at any point in the operating cycle of the ring counter, a ground potential or positive pulse of suitable amplitude is applied to the common reset lead R17, the flip-flop ST will be set, or turned-on, and the remaining flip-flops 0 through 9 will be reset, or turned-off. Thus, the ring counter may be returned to its "normal" condition at any time by suitably energizing the common reset lead R17.

When the circuit requirements are such that less than all of the leads are needed, the unnecessary leads may be left unconnected and, therefore, in some instances, it is considered unnecessary to show them in the detailed circuit disclosure.

The Regenerative Amplifier

Figure 18A:
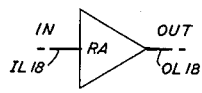
Figure 18B:
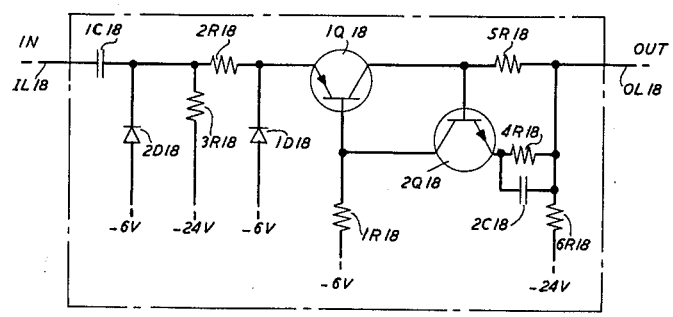

FIG. 18A shows the symbol for a regenerative amplifier with respect to which equivalent circuitry is shown in FIG. 18B. This amplifier is a monostable circuit which in its stable or nonexcited state causes a potential of approximately −24 volts to appear on its output lead OL18. If a positive-going input pulse of at least two volts amplitude and at least two miscroseconds duration is applied to input lead IL18, the amplifier is energized thereby to generate and produce at its output lead OL18 a positive-going output pulse of substantially rectangular wave form, and manifested by the output potential changing from −24 volts to −8 volts. The output pulse will have a duration determined by the resistance-capacity characteristics of the circuit, a typical duration being, for instance, in the order of a few milliseconds. This amplifier may be used when the amplitude of the available input pulse has become attenuated and hence the pulse must be amplified sufficiently to effect the operation of a succeeding circuit, or when it is for some other reason desirable to interconnect components to assure reliable operation thereof.

DETAILED DESCRIPTION OF SYSTEM

This portion of the description relates to the detailed operation of the exemplary switching center disclosure shown in FIGS. 3 through 11; and which switching center circuitry is particularly adapted for use in a switching system comprising a plurality of such switching centers, such a plurality of switching centers being diagrammatically illustrated in FIG. 1.

Codes

In the switching system of the instant invention, each message has associated therewith a multidigit address code, and the control of the circuitry is selectively effected in accordance with suitable prearranged combinations of electrical stimuli derived from said address codes and applied to said circuitry. Such codes may consist, for example, of binary code digits, which binary code digits in turn may, for example, be translated into decimal code digits. In a system such as herein envisaged, at least four digits of a multidigit address code are required to implement the control of the circuitry. These four digits may, for example, appear in the following order: P, D, S, C; and wherein the said digits represent an equivalent number, letter, character, or symbol. These four digits have the following significance: P indicates the degree of priority to be accorded to a particular message, D indicates the geographical direction in which the message is to progress, and S and C together indicate the specific switching center of destination to which the message is to be directed.

Priority

In the exemplary disclosure, it will be assumed that if the priority digit (P) is any number other than an "8" or a "9" the respectively associated message is of ordinary or "no priority," and will be recognized as an NP message. Such (NP) calls are accorded no special treatment, but merely have access to any currently available appropriate trunk path. It is also assumed that if the priority (P) digit is an "8" or a "9" the message respectively associated therewith is "priority" (P) or "right-of-way" (ROW) message.

In the case of a priority (P) message, an idle trunk will be sought, and if all of the trunks in all of the groups affording ultimate access to the switching center of destination are busy, memory equipment will remember the identities of the trunk groups wherein an idle trunk was sought and, if required, the trunk seeking cycle will be repeated among the trunks of those trunk groups.

In the case of a right-of-way (ROW) message, an idle trunk will be sought in the first choice trunk group even though all trunks therein may be busy, and, if the last trunk in said first choice trunk group is busy with any call other than an ROW call, the said last trunk of said first choice group will be pre-empted or "bumped-off" to serve the ROW call. If, on the other hand, the last trunk of the first choice trunk group is busy with an ROW call, the trunk selecting equipment will route advance to seek an idle trunk in another trunk group wherein if all trunks are busy the last trunk is not busy with an ROW call. If all of the trunks in all of the trunk groups are busy and if all of the last trunks in said groups are busy with ROW calls, the trunk selecting equipment will route advance to effect connection to a reorder trunk.

Direction

In the exemplary disclosure, it will be assumed that the direction digit will be either a "9" or a "6," respectively equivalent to an E or a W, and respectively indicative that the message is to progress East or West from the instant switching center 23 (FIG. 1) to the switching center of destination as called for by the specific destination code. If the direction digit is either a "5" or a "0," respectively equivalent to an E′ or a W′, this will be respectively indicative that "code conversion" will be required, thereby to forestall an attempt by the trunk selecting equipment at doubling back and forth on the trunking paths, otherwise known as "ring-around-the-rosie" effect.

Destination

The destination code, represented by the letters S and C together, comprises any two-digit number representative of any correspondingly numbered switching center of destination (e.g., 57, FIG. 1) to which the instant switching center 23 (FIG. 1) may be connected, via either a direct or an alternate route trunk group.

Trunk Hunting, Nonpriority (NP)

Let it be assumed that the switching center (e.g., 23, FIG. 1) is servicing a message which has associated therewith a multidigit address code having included therein as the respective numerical equivalents of the significant digits P, D, S, and C, the combination 2957, for example.

The combinations of electrical impulses received at switching center 23 (FIG. 1), and respectively representing digits P, D, S, and C in binary code, are respectively stored in the registers W1, W2, W3, and W4 of the shift register SR (FIG. 11). The outputs of registers W1, W2, W3, and W4 are transmitted via gate groups PG, DG, SG, and CG (FIG. 11), respectively, conductor groups CW1, CW2, CW3, and CW4 (FIG. 11), respectively, gate groups GW1, GW2, GW3, and GW4 (FIG. 11), respectively, conductor groups SW1, SW2, SW3, and SW4 (FIG. 11), respectively, in cable SO to priority code translator PDT (FIG. 8), direction digit translator DDT, tens digit translator TDT, and units digit translator UDT (FIG. 10), respectively. Since the priority (P) digit is, in this instance, assumed to be a "2," the "2" binary code input to the priority code translator PDT (FIG. 8) will cause it to transmit a corresponding "2" decimal output, via conductor group CP, to the crossconnecting terminal P2 (FIG. 8). But since the crossconnecting terminals to P0 through P7 (FIG. 8) are not cross-connected, the (P) digit 2 will be ineffective. Therefore, the presence of a "2" as the input to the translator PDT, effectively elicits a negative response, thereby apprising the trunk selecting equipment that this is a lowpriority or NP message. The D digit number "9" causes the direction digit translator DDT (FIG. 10) to indicate that the message is to progress in an easterly direction to its destination. The numbers "5" and "7," respectively, cause the tens digit translator TDT and the units digit translator UDT (FIG. 10), to produce outputs of "5" and "7," respectively, which outputs together indicate that the switching center 57 is the ultimate destination. The outputs of the translators DDT, TDT and UDT are in decimal code form, and are extended via conductor groups CD, CT and CU, respectively, and suitable cross-connections to the D, T and U terminals, respectively, of one or more of the destination and direction "AND" gates (e.g., 957) in group DAG (FIG. 10). The output of gate 957 (FIG. 10), for example, is connected via conductor CE57 to the "SET" conductor S of flip-flop E57 (FIG. 10), causing the directional and destination flip-flop E57 to operate and produce an electrical potential change on its "OUT" conductor OE57. The other directional and destination flip-flops (FIGS. 8 and 10) may be similarly operated in response to other suitable code combinations. The operation of any directional and destination flip-flop (e.g., E57) transmits a potential change via a conductor in cable OC57 to energize corresponding route advance circuitry (FIG. 5), which in turn energizes corresponding trunk hunting circuitry (FIG. 6), thereby causing an idle trunk to be successively sought, in a predetermined order of preference, among the several trunk groups embraced in that particular trunk group route advance pattern. If an idle trunk is found in any one of the trunk groups, the trunk hunting equipment will energize designating equipment (FIGS. 3 and 4) to designate said idle trunk for interconnection. If all of the trunks in all of the trunk groups of any particular route advance pattern are busy, the route advance circuitry (FIG. 5) will route advance to designate connection to a reorder trunk (FIG. 4).

*Class of Service*

The class of service register CSR (FIG. 11) ascertains, by suitable means known in the prior art, whether or not the line or trunk incoming from a preceding switching center (or station) to the instant switching center (e.g., 23, FIG. 1), over which the multidigit address code was received, is entitled to forward a message on an ROW (right-of-way) service basis. If register CSR (FIG. 11) ascertains that the incoming call is entitled to ROW service, register CSR "remembers" that the incoming line or trunk is entitled to such ROW service and causes a change in electrical potential to appear on its output conductor CC. The potential change on conductor CC is applied to the control conductor of transmission enabling gate CSG (FIG. 11) causing gate CSG to become enabled. Assuming that the register connector gates RCG (FIGS. 9 and 11) are enabled, a positive-going pulse from multivibrator MV (FIG. 11) is transmitted, via conductor M, gates MSG and CSG (FIG. 11), conductor SPL, gate ITMG (FIG. 11) and conductor ITM, to the "SET" conductor S of the special loop flip-flop SL (FIG. 8), causing flip-flop SL to operate and produce an electrical potential change on its "OUT" conductor SLC. The potential change on conductor SLC is applied to the control conductor of transmission enabling gate SLG (FIG. 8), causing gate SLG to become enabled.

*Trunk Hunting, Right-of-Way (ROW)*

Now let it be assumed that the switching center (e.g., 23, FIG. 1) is servicing a message which has associated therewith a multidigit address code having included therein as the respective numerical equivalents of the significant digits P, D, S, and C, the combination 9957, for example. The combinations of electrical impulses received at switching center 23, and respectively representing the digits of said numerical combinations in binary code, are respectively stored in the shift regster SR (FIG. 11), and are transmtted, in the manner above described, to the translators PDT, DDT, TDT, and UDT (FIGS. 8 and 10) respectively. Bearing in mind that the priority (P) digit is, in this instance, assumed to be a "9," the "9" binary code input to the priority code translator PDT (FIG. 8) will cause it to transmit a corresponding "9" decimal output, via conductor group CP, cross-connecting terminal P9, cross-connection PXC9, cross-connecting terminal XP9, conductor C9, the enabled gate SLG, and conductor OC9, to "SET" conductor S of right-of-way flip-flop RW (FIG. 8), causing flip-flop RW to operate and produce an electrical potential change on its "OUT" conductor ROW. The electrical potential change on conductor ROW is applied to the route advance circuitry (FIGS. 5 and 7) and to the trunk hunting circuitry (FIG. 5), thereby inhibiting or modifying the regular operation of the route advance equipment, and, at the same time, enabling certain portions of the trunk hunting circuitry, thereby permitting the trunk hunting equipment to accord "bump-off" privileges to the "right-of-way" call being processed. Since the instant ROW message has associated therewith the same numerical equivalents for the digits D, S, and C, as in the previously described NP message, the outputs of translators DDT, TDT, and UDT (FIG. 10) will be the same, and will, in the same manner as previously stated, control the functioning of the route advance equipment and the trunk hunting equipment, with the exception, however, as above noted, that the ROW code will inhibit or modify the regular operation of the route advance equipment.

*Trunk Hunting, Priority (P)*

Now let it be assumed that the switching center (e.g., 23, FIG. 1) is serving a message which has associated therewith a multidigit address code having included therein as the respective numerical equivalents of the significant digits P, D, S, and C, the combination 8957, for example. The combinations of electrical impulses received at switching center 23, and respectively representing the said numerical combinations in binary code, are respectively stored in the shift register SR (FIG. 11) and are transmitted, in the manner previously described, to the translators PDT, DDT, TDT, and UDT (FIGS. 8 and 10), respectively. Now bearing in mind that the priority (P) digit is, in this instance, assumed to be an "8," the "8" binary code input to the priority code translator PDT (FIG. 8) will cause it to transmit a corresponding "8" decimal output, via conductor group CP, cross-connecting terminal P8, cross-connection PXC8, cross-connecting terminal XP8, and conductor C8 to "SET" conductor S of priority flip-flop PR (FIG. 8), causing flip-flop PR to operate and produce an electrical potential change on its "OUT" conductor PRI. The electrical potential change on conductor PRI is applied to the route advance circuitry (FIG. 5) and to the route advance auxiliary memory circuitry (FIG. 9), thereby modifying the regular operation of the route advance equipment (FIG. 5) so as to permit priority treatment to be accorded to the (P) message, and, at the same time, enabling the auxiliary memory circuitry (FIG. 9), thereby causing said auxiliary memory circuitry to record the identities of those trunk groups in which an idle trunk was sought.

*Code Conversion*

Now let it be assumed that the switching center (e.g., 23, FIG. 1) is servicing a message which has associated therewith a multidigit address code having included therein as the respective numerical equivalents of the significant code digits P, D, S, and C, the combination 8935, for example. The combinations of electrical impulses received at switching center 23, and respectively representing the said numerical combination in binary code, respectively are stored in the shift register SR (FIG. 11) and are transmitted, in the manner previously described, to the translators PDT, DDT, TDT, and UDT (FIGS. 8 and 10), respectively, causing said translators to function in a manner similar to that previously described with reference to a priority (P) call. In the instant example, however, the S and C digits are different; said digits being "3" and "5" respectively, and signifynig that the specific address code received at switching center 23 (FIG. 1) calls for a trunk path affording access to switching center 35 (FIG. 1) as the switching center of destination. Obviously, the most direct path from switching center 23 to switching center 35 is via one of the five trunks (15 to 19) in trunk group 35. If all of the trunks in trunk group 35 are busy, it is obvious that any other trunk group radiating from switching center 23, and which trunk group might afford an alternate and indirect route to switching center 35 would entail a change in direction. In this event "code conversion" will be required to forestall the "ring-around-the-rosie" effect, to which effect allusion was previously made. When the route advance pattern at switching center 23 calls for a trunk group to switching center 35, for example, as one of the choices among the trunk groups, as evidenced, for example, by the operation of either flip-flop ML35a (FIG. 5) or flip-flop ML35c (FIG. 7), code conversion circuitry will be effectuated. More specifically, let it be assumed that flip-flop ML35a (FIG. 5) has been operated to designate trunk group 35 (FIG. 1) as the last choice. With flip-flop ML35a operated, the change in electrical potential on its "OUT" conductor C35a is applied to one of the input conductors of the code conversion "OR" gate COG (FIG. 7). Similarly, if flip-flop ML35c is operated, an electrical potential change is applied to another of the input conductors of gate COG. In a like manner, the "OUT" conductors of still other flip-flops may be respectively connected to still other input conductors of gate COG. Therefore, an electrical potential change applied to any input conductor of gate COG will cause an eletcrical potential change to appear on the output conductor CDC of gate COG, which potential change is transmitted, via the enabled gate CDCG and conductor OCDC, to the input of the code conversion control circuit CCT (FIG. 11), thereby causing code conversion to be effected by means of and in accordance with practices known in the art.

Tracing Typical Calls

To further facilitate an understanding of the operation of the system, several typical calls will be discussed and the concomitant circuit operations will be traced in detail.

Nonpriority Message

As a first example, let it be assumed that a nonpriority (NP) message is in process of being served by the switching center (e.g., 23, FIG. 1). Let it be further assumed that said NP message has associated therewith a multi-digit address code having included therein, as the respective equivalents of the significant digits P, D, S, and C, the digital combination 2957, for example. Each such digit or "word" as received at the switching center (e.g., 23, FIG. 1) consists of a combination of electrical impulses representnig said digit or word in binary code notation. Each such binary digit or word is derived from four "bits," each bit representing either one or the other of two electrical conditions of states, such, for example, as either a negative or a positive potential, current or no current, or either one of two different electrical amplitudes, such different electrical states being respectively charatcerized as a "1" or a "0." The digits P, D, S, and C are respectively registered in the corresponding digit or word registers W1, W2, W3, and W4 of the binary shift register SR (FIG. 11). Each digit or word register (e.g., W1, FIG 11) will produce an output corresponding to its respective input, which output, in the instant disclosure will be assumed to consist of a combination of four bits, each bit being represented either by a positive or a negative potential appearing on its corresponding output conductor. Such binary register arrangements are well known in the art and, hence, require no further description. Assuming the P digit to be a "2," representing a no-priority message, the W1 register (FIG. 11) output conductors PB1, PB2, PB3, and PB4 will respectively have negative, positive, negative, and negative potentials appearing thereon, respectively corresponding to the above-mentioned "0," "1," "0," and "0" conditions. These potentials on conductors PB1, PB2, PB3, and PB4 will respectively be applied to the control conductors of transmission enabling gates PG1, PG2, PG3, and PG4 (FIG. 11), thereby causing gate PG2 to be enabled, and causing gates PG1, PG3, and PG4 to remain in their colsed or disabled states. The gates of gate groups DG, SG, and CG (FIG. 11) are structurally and operatively similar to those of gate group PG (FIG. 11), and are respectively controlled by the output potentials of registers W2, W3, and W4 (FIG. 11).

When the digits P, D, S, and C have been received and have been stored in registers W1, W2, W3, and W4, respectively, an electrical potential, indicative that the essential priority, direction, and destination data have been registered, is applied, via start conductor SC, to start circuit S (FIG. 11). The potential on conductor SC causes the start circuit S to apply an electrical potential change, via its output conductor ACC, to the "SET" conductor S of gate control flip-flop GC (FIG. 11), causing flip-flop GC to operate and produce an electrical potential change on its "OUT" conductor SMC. The electrical potential change on conductor SMC is applied to the parallel-connected control conductors of all of the transmission enabling gates of the register connector gates RCG (FIGS. 9 and 11), thereby causing said gates to become enabled. The multivibrator MV (FIG. 11) now transmits an output pulse, via conductor MS, gate MSG, and conductor MSO, to the parallel-connected input conductors of all of the gates of gate groups PG, DG, SG, and CG (FIG. 11). It will be remembered that only those gates (e.g., PG2) having a positive potential on their respective control conductors will be enabled. Therefore, for the P digit registration, in the instant example, the pulse on the input conductor of gate PG2 will be transmitted therethrough, thence, via conductor PC2, gate PCG2, conductor PW2, and conductor group SW1 in cable SO, to priority code translator PDT (FIG. 8). In a similar manner, the electrical conditions on the output conductors of registers W2, W3, and W4 will respectively be used to control the gates of gate groups DG, SG, and CG; and transmission will be effected through corresponding register connector gates, conductor groups SW2, SW3, and SW4, respectively, in cable SO, to translators DDT, TDT, and UDT (FIG. 10), respectively.

The P digit, in the instant example, is indicative of an NP message. Therefore, the translator PDT (FIG. 8) effectively produces a negative response, thereby apprising the trunk selecting equipment that this is a low priority or NP message, as previously explained.

The D digit, in the instant example, being assumed to be a "9," causes the translator DDT (FIG. 10) to transmit a potential change representing a corresponding "9" decimal code output, via conductor group CD, cross-connecting terminal D9, cross-connection DXC9, and cross-connecting terminal XD9, to the "D" input of "AND" gate 957 (FIG. 10). The potential change on cross-connecting terminal D9 (FIG. 10) is also transmitted, via cross-connection DDCX9, cross-connecting terminal DXD9 (FIG. 8), to the input conductor 986 of delay circuit DE (FIG. 8), thereby, after a brief interval, causing delay circuit DE to produce an electrical potential change (or positive potential) on its output conductor DEO.

The S digit, in the instant example, being assumed to be a "5," causes the translator TDT (FIG. 10) to transmit a potential change representing a corresponding "5" to decimal code output, via conductor group CT, cross-connecting terminal T5, cross-connection TXC5, and cross-connecting terminal XT5, to the "T" input of "AND" gate 957 (FIG. 10).

The C digit in the instant example, being assumed to be a "7," causes the translator UDT (FIG. 10) to transmit a potential change representing a corresponding "7" decimal output via conductor group CU, cross-connecting terminal U7, cross-connection UXC7, and cross-connecting terminal XU7, to the "U" input of "AND" gate 957 (FIG. 10).

The concurrent application of potential change conditions to the D, T and U terminals of "AND" gate 957 causes an electrical potential change (or positive potential) to appear on its output conductor CE57, which output potential is applied to the "SET" conductor S of flip-flop E57 (FIG. 10), thereby causing flip-flop E57 to operate. The "AND" gate 957 is one of a plurality of such gates embraced in group DAG (FIG. 10), each of which gates is respectively operable in response to a unique combination of D, T, and U codes, such combination being known as a specific code, and each of which gates has its output conductor respectively connected to control the operation of a corresponding flip-flop (e.g., E57). The electrical potential change (or positive potential) on the output conductor CE57 of "AND" gate 957 is also applied to the corresponding input conductor of the general code inhibiting "OR" gate GCIO (FIG. 8), thereby causing an electrical potential change (or positive potential) to appear on the output conductor GCI. The electrical potential change (or positive potential) on conductor GCI is applied to the parallel-connected control conductors of transmission inhibiting gates GIE, GIE', GIW and GIW' (FIG. 8), thereby disabling said gates. With gates GIE, GIE', GIW and GIW' disabled, the paths between delay circuits DE, DE', DW and DW' (FIG. 8), and the general code flip-flops EYY, E'YY, WXX and W'XX (FIG. 8), respectively, are opened, thus preventing the delayed outputs from said delay circuits from setting or operating any of the general code flip-flops EYY, E'YY, WXX and W'XX when any specific destination code has been received.

The operation of flip-flop E57, in the instant example, indicates that the message is to proceed in an easterly direction and that switching center 57 is the ultimate switching center destination. Flip-flop E57, in its operated condition, causes an electrical potential change (or positive potential) to appear on its "OUT" conductor OE57. The potential change on conductor OE57 in cable OC57 is applied to "SET" conductor S of flip-flop ML57a (FIG. 5), to the parallel-connected control conductors of transmission enabling gates RA35a, RA41a, and REa (FIG. 5), and via cable C1 to the parallel-connected control conductors of transmission enabling gates 57–35a, 57–41a, and 57–ROa (FIG. 6), thereby causing flip-flop ML57a to operate, and also causing the said gates to be enabled. The operation of flip-flop ML57a, in the instant example, indicates that trunk group 57 is the first choice in which to seek an idle trunk to switching center 57.

Truck Hunting

The operation of flip-flop ML57a (FIG. 5) causes an electrical potential change (or positive potential) to appear on its "OUT" conductor TGC57a. The electrical potential change on conductor TGC57a is transmitted, via diode D57a and conductor TG57, to one of the inputs of the trunk group "OR" gate TGG (FIG. 6), and to the parallel-connected control conductors of all of the transmission enabling gates TG03 through TG07 (FIG. 6), thereby enabling said "OR" gate and said transmission enabling gates. The enablement of "OR" gate TGG causes it to transmit an electrical potential change (or positive potential), via conductor GC, to the control conductor of the slow-acting transmission enabling gate SCG (FIG. 6). If the interval during which the positive potential is applied to the control conductor of the slow-acting gate SCG is of sufficient duration, the 100 kilocycle oscillator CO (FIG. 6) will transmit a pulse, via conductor 00, gate SCG and conductor SCC, to the "START" conductor S of the trunk scanning ring conductor TSRC (FIG. 6), thereby causing the ring counter TSRC to start its trunk scanning cycle whereby to seek an idle trunk in the trunk group designated by the operation of a route advance flip-flop (e.g., ML57a). The delay interval inherent in slow-acting gate SCG is of suffifficient duration to prevent the starting of ring counter TSRC (FIG. 6) before the operation of the route advance flip-flop indicative of the next trunk group choice (e.g., ML35a) and before the resetting of the previously operated route advance flip-flop (e.g., ML57a). This slow-acting characteristic of gate SCG is of importance in the event that all of the trunks are busy in the trunk group designated by the previously operated flip-flop (e.g., trunk group 57 designated by the operation of flip-flop ML57a). The electrical potential from the output of diode D57a (FIG. 5) on conductor TG57 is also transmitted, via the enabled auxiliary memory gate AMG57 (FIG. 9) and conductor A57, to the input conductor of the auxiliary memory set transmission enabling gate AS57 (FIG. 9). At this time, since this is not a P (priority) message, there will be no "enabling" potential on conductor "PR1"; and, therefore, even though gate AGE (FIG. 9) is enabled, no enabling potential will be applied to conductor AGC connected in parallel to the control conductors of gates AS57, AS35, AS41, AS85, and AS26 (FIG. 9); and, therefore, neither the auxiliary memory flip-flop AML57 (FIG. 9) nor any of the other auxiliary memory flip-flops may be turned on at this time. The e l e c t r i c a l potential change on conductor TGC57a is also applied to the reset conductor R of flip-flop ML26b (FIG. 5), thereby causing flip-flop ML26b to be turned off or reset in the event that it should be in its turned-on or "SET" state. At the same time, the electrical potential change (positive potential) on conductor TGC57a is also applied to the upper input conductor of all trunks busy "AND" gate ATB57a (FIG. 5). Also, at the same time, the electrical potential change on conductor TGC57a is transmitted, via conductor E57S in cable OC57, to the "SET" conductor S of directional and destination flip-flop E57 (FIG. 10), thereby providing means for setting flip-flop E57 under certain conditions to be described later.

Trunk Groups

Digressing from the operation of the trunk scanning circuitry—the general organization of the trunk groups and the circuitry germane thereto will now be described. In the exemplary disclosure of the invention, a plurality of lines or trunks are provided, together with terminating circuits therefor, and means for designating certain of said lines or trunks for interconnection (FIGS. 3 and 4). Each line or trunk (e.g., L07, FIG. 3) is terminated in a terminating circuit (e.g., CCT.07, FIG. 3). The purpose of such a terminating circuit is to afford means for coupling the conductors of a line or trunk to a switching network, and to provide means for furnishing a supervisory signal or signals indicative of the idle or busy status of said line or trunk. To furnish such a supervisory signal or signals, each such terminating circuit (e.g., CCT.07, FIG. 3) is provided with a sleeve (S) conductor (e.g., S07, FIG. 3). To furnish communication paths, each such terminating circuit (e.g., CCT.07, FIG. 3) is provided with a tip (T) and a ring (R) conductor (e.g., T07 and R07, FIG. 3). The several sets of T, R, and S conductors are respectively connected to correspondingly numbered cross-connecting terminals, thereby providing for flexibility of cross-connection to the switching network and trunk selecting equipment.

The lines or trunks are resolved into trunk groups. Several such trunk groups are diagrammatically illustrated in FIG. 1 (e.g., TG 57). In the exemplary disclosure, each such trunk group consists of not more than five trunks; trunk group 57, for example, comprises trunks 03 through 07. In the exemplary disclosure, the number of trunks per group is limited to five because the trunk scanning ring conductor TSRC (FIG. 6) employs five stages in addition to the "START" stage. A greater or a less number of trunks per group may be had by providing the trunk scanning ring conductor with a greater or less number of stages. The sleeve conductors of trunk group 57, for example, consisting of conductors S03, S04, S05, S06, and S07 (FIG. 3) are respectively cross-connected to sleeve conductors S57–1, S57–2, S57–3, S57–4, and S57–5 in cable S57 (FIG. 3), and thereover respectively connected to the control conductors of the busy test transmission inhibiting gates BTG03, BTG04, BTG05, BTG06, and BTG07 (FIG. 6), and thence, via common sleeve cable CSC (FIG. 5), to the input conductors S57–1, S57–2, S57–3, S57–4, and S57–5, respectively, of the trunk group busy "AND" gate TGB57 (FIG. 5). In a similar manner, the sleeve conductors of trunk groups 35, 41, 85, and 26 (FIGS. 3 and 4) are connected to the control conductors of the busy test transmission inhibiting gates BTG– (FIG. 6) and to the input conductors of the trunk group busy gates TGB– (FIG. 5) respectively corresponding thereto.

Sleeve Conductor Supervisory Signals

In the exemplary disclosure of the invention, the terminating circuits (e.g., CCT.03, FIG. 3) are assumed to be of a type known in the art, wherein when the line or trunk is idle the sleeve conductor (e.g., S03) is normally at a negative potential, and when the line or trunk is in use the sleeve conductor assumes a ground (or positive) potential, thereby giving an "off-hook" or busy signal. During the interval that the line or trunk is being restored to an idle condition, the sleeve conductor puts out a negative-going pulse.

Now let it be assumed, for example, that all of the trunks of trunk group 57 (FIG. 3) are busy. Under this condition all of the sleeve conductors S03, S04, S05, S06, and S07 of trunk group 57 will be at ground (or positive) potential, which potentials are applied, via the previously described path, to the control conductors of gates BTG03, BTG04, BTG05, BTG06, and BTG07, respectively (FIG. 6), thereby disabling all of said gates. The ground (or positive) potentials on the sleeve conductors S03, S04, S05, S06, and S07 are also applied, via the previously described path, to the input conductors S57–1, S57–2, S57–3, S57–4, and S57–5, respectively, of "AND" gate TGB57 (FIG. 5). With the concurrent application of ground (or positive) potentials to all of the inputs of gate TGB57, an electrical potential change (or positive potential) appears on output conductor TGC57, thereby indicating that all of the trunks in trunk group 57 are busy. Under this condition, the electrical potential change (or positive potential) on conductor TGC57 is applied to the lower input conductors of all trunks busy "AND" gates ATB57a (FIG. 5) and ATB57c (FIG. 7). The upper input conductor of gate ATB57a (FIG. 5), at this time, also has a positive potential applied thereto, as previously described. The electrical potential change (or positive potential) on conductor TGC57 is also transmitted to the control conductor of transmission inhibiting gate AIG57 (FIG. 9), thereby disabling gate AIG57. The concurrent application of positive potentials to both of the input conductors of "AND" gate ATB57a (FIG. 5) causes an electrical potential change (or positive potential) to appear on its output conductor RA1. At this time, since this is not a right-of-way (ROW) message, there will be no "disabling" potential on conductor ROW; and, therefore, the transmission inhibiting gate I57a (FIG. 5) and all of the other transmission inhibiting gates (e.g., I35a) having their control conductors connected to conductor ROW will be in their enabled states.

Route Advance

Gate RA35a (FIG. 5), it will be remembered, is also in its enabled state. Therefore, the positive output potential on conductor RA1 is transmitted, via gate I57a, conductor RA2, gate RA35a (FIG. 5), and conductor 35a, to the "SET" conductor S of route advance flip-flop ML35a (FIG. 5), causing flip-flop ML35a to operate and produce an electrical potential change (or positive potential) on its "OUT" conductor C35a. The operation of flip-flop ML35a, in the instant example, indicates that trunk group 35 is the second choice in which to seek an idle trunk, and whereby indirect access may be had to switching center 57. Since it was assumed that all of the trunks in trunk group 57 are busy, it is obvious that the search for an idle trunk in trunk group 57 would be fruitless. Therefore, under this condition, by virtue of the previously described delay inherent in slow-acting gate SCG (FIG. 6), the trunk scanning ring counter TSRC (FIG. 6) was prevented from starting, thereby preventing the seeking of an idle trunk in trunk group 57. The electrical potential change (or positive potential) on conductor C35a is transmitted, via diode D35a (FIG. 5) and conductor TG35, to the input conductor TG35 of "OR" gate TGG (FIG. 6) and to the parallel-connected control conductors of all of the transmission enabling gates TG15 through TG19 (FIG. 6), thereby again enabling said "OR" gate, and enabling said transmission enabling gates. The enablement of "OR" gate TGG again initiates the conditional operation of slow-acting gate SCG (FIG. 6) which, in turn, again initiates the conditional start of the ring counter TSRC (FIG. 6), in the manner previously described. The electrical potential from the output of diode D35a (FIG. 5) on conductor TG35 is also transmitted, via the enabled gate AMG35 (FIG. 9) and conductor A35, to the input conductor of the gate AS35 (FIG. 9), which gate is not enabled at this time, for reasons previously explained. At the same time, the electrical potential change (or positive potential) on conductor C35a is also applied to the upper input conductor of all trunks busy "AND" gate ATB35a (FIG. 5). Also, at the same time, the electrical potential change (or positive potential) on conductor C35a is applied to the reset conductor R of route advance flip-flop ML57a (FIG. 5), causing flip-flop ML57a to be turned-off or reset. Also, at this time, the electrical potential change (or positive potential) on conductor C35a is applied to one of the input conductors of code conversion "OR" gate COG (FIG. 7), causing an electrical potential change to appear on the output conductor CDC of gate COG, and thereby causing code conversion to be effected, as previously described.

Now let it be assumed, for example, that all of the trunks of trunk group 35 (FIG. 3) are busy. Under this condition, all of the sleeve conductors S15, S16, S17, S18, and S19 of trunk group 35 will be at ground (or positive) potential, which potentials are applied, via a path similar to that previously described with reference to trunk group 57, to the control conductors of gates BTG15, BTG16, BTG17, BTG18, and BTG19, respectively (FIG. 6), thereby disabling all of said gates. The ground (or positive) potentials on the sleeve conductors S15, S16, S17, S18, and S19 are also applied, via a path similar to that previously described with reference to trunk group 57, to the input conductors S35–1, S35–2, S35–3, S35–4, and S35–5, respectively, of "AND" gate TGB35 (FIG. 5). The concurrent application of ground (or positive) potentials to all of the inputs of gate TGB35 causes an electrical potential change (or positive potential) to appear on its output conductor TGC35, thereby indicating that all of the trunks in trunk group 35 are busy. Under this condition, the electrical potential change (or positive potential) on conductor TGC35 is applied to the lower input conductors of all trunks busy "AND" gates ATB35a (FIG. 5) and ATB35c (FIG. 7). The upper input conductor of gate ATB35a (FIG. 5), at this time, also has a positive potential applied thereto, as previously described. The electrical potential change (or positive potential) on conductor TGC35 is also transmitted to the control conductor of transmission inhibiting gate AIG35 (FIG. 9), thereby disabling gate AIG35.

The concurrent application of positive potentials to both of the input conductors of "AND" gate ATB35a (FIG. 5) causes an electrical potential change (or positive potential) to appear on its output conductor RA3. At this time, since as previously assumed, this is not an ROW message, there will be no "disabling" potential on the control conductor of gate I35a (FIG. 5) and, therefore, gate I35a will be in its enabled state. Gate RA41a (FIG. 5), it will be remembered, is also in its enabled state. Therefore, the positive output potential on conductor RA3 is transmitted, via gate I35a (FIG. 5), conductor RA4, gate RA41a (FIG. 5) and conductor 41a, to the "SET" conductor S of route advance flip-flop ML41a (FIG. 5), causing flip-flop ML41a to operate and produce an electrical potential change (or positive potential) on its "OUT" conductor C41a. The operation of flip-flop ML41a, in the instant example, indicates that trunk group 41 is the third choice in which to seek an idle trunk and whereby indirect access may be had to switching center 57. Since all of the trunks in trunk group 35 were assumed to be busy, for reasons previously explained the trunk scanning ring counter TSRC (FIG. 6) was prevented from starting, thereby preventing the fruitless seeking of an idle trunk in trunk group 35. The electrical potential change (or positive potential) on conductor C41a is transmitted, via diode D41a (FIG. 5) and conductor TG41, to the input conductor TG41, "OR" gate TGG (FIG. 6) and to the parallel-connected control conductors of all of the transmission enabling gates TG20 through TG24 (FIG. 6), thereby again enabling said "OR" gate, and enabling said transmission enabling gates. The electrical potential from the output of diode D41a (FIG. 5) on conductor TG41 is also transmitted, via the enabled gate AMG41 (FIG. 9) and conductor A41, to the input conductor of the gate AS41 (FIG. 9), which gate, as previously explained, is not enabled at this time. At the same time, the electrical potential change (or positive potential) on conductor C41a is also applied to the upper input conductor of all trunks busy "AND" gate ATB41a (FIG. 5). Also, at the same time, the electrical potential change (or positive potential) on conductor C41a is applied to the reset conductor R of route advance flip-flop ML35a (FIG. 5), causing flip-flop ML35a to be turned off or reset.

Now let it be assumed, for example, that the first trunk (i.e., L20) in trunk group 41 (FIG. 3) is idle and that the remaining trunks in trunk group 41 are busy. Under this condition, the sleeve conductor S20 (FIG. 3) will be at a negative potential, and the remaining sleeve conductors S21, S22, S23, and S24 of trunk group 41 will be at ground (or positive) potential. These sleeve potentials are applied, via a path similar to that previously described with reference to trunk group 57, to the control conductors of gates BTG20, BTG21, BTG22, BTG23, and BTG24, respectively (FIG. 6), thereby enabling gate BTG20, and, at the same time, disabling gates BTG21 through BTG24. The said potentials on the sleeve conductors S20, S21, S22, S23, and S24 are also applied, via a path similar to that previously described with reference to trunk group 57, to the input conductors S41–1, S41–2, S41–3, S41–4, and S41–5, respectively, of "AND" gate TGB41 (FIG. 5). Since less than all of the input conductors of "AND" gate TGB1 have ground (or positive) potentials connected thereto, the output conductor of the "AND" gate TGB41 will remain at its normal potential, that is to say, gate TGB41 will not produce an electrical potential change (or positive potential) on its output conductor TGC41. The absence of an electrical potential change (or positive potential) on conductor TGC41 indicates that there is at least one idle trunk in trunk group 41. Under this condition, the normal potential on conductor TGC41 is applied to the parallel-connected lower input conductors of all trunks busy "AND" gates ATB41a (FIG. 5) and ATB41c (FIG. 7). The upper input conductor of "AND" gate ATB41a (FIG. 5), at this time, has a positive potential applied thereto, as previously described. The normal electrical potential on conductor TGC41 is also applied to the control conductor of transmission inhibiting gate AIG41 (FIG. 9), thereby permitting gate AIG41 to remain in its enabled state. At this time, since, as previously assumed, this is not an ROW message, there will be no "disabling" potential on the control conductor of gate I41a (FIG. 5), and, therefore, gate I41a will be in its enabled state. But since, at this time, only one of the input conductors of "AND" gate ATB41a is supplied with a positive potential, the "AND" gate ATB41a will not produce an electrical potential change (or positive potential) on its output conductor RA5. The enablement of "OR" gate TGG (FIG. 6) causes it to transmit an electrical potential change (or positive potential), via conductor GC, to the control conductor of the slow-acting transmission inhibiting gate SCG (FIG. 6). Since it is assumed that there is at least one idle trunk in trunk group 41 (i.e., trunk L20—the first trunk in trunk group 41), after the slow-acting gate SCG has had sufficient time in which to operate, the 100 kilocycle oscillator CO (FIG. 6) will transmit a pulse, via conductor 00, gate SCG and conductor SCC, to the "START" conductor S of the trunk scanning ring counter TSRC (FIG. 6), thereby causing the ring counter TSRC to start its trunk scanning cycle. When the ring counter TSRC has advanced to its No. 1 stage, an electrical potential change (or positive potential) will be transmitted from stage No. 1, via conductor SC1, to the parallel-connected input conductors of transmission enabling gates TG03, TG15, TG20, TG31, and TG44 (FIG. 6). Gate TG20, it will be remembered, is enabled at this time by virtue of the positive potential applied to its control conductor; and transmission inhibiting gate BTG20, it will be remembered, is also enabled at this time by virtue of the negative potential (idle trunk sleeve) on its control conductor. Therefore, under this condition, the electrical potential change (or positive potential) output of the No. 1 stage of ring counter TSRC (FIG. 6) on conductor SC1 will be transmitted, via gate TG20 (FIG. 6), conductor 41–1 and gate BTG20 (FIG. 6), to the trunk designating conductor TD20. The electrical potential change (or positive potential) on conductor TD20 is applied to the correspondingly numbered input conductor of "OR" gate OR41 (FIG. 6), thereby enabling gate OR41. The enablement of gate OR41 causes it to transmit an electrical potential change (or positive potential), via conductor RS, to the lower input conductor of "OR" gate SRG (FIG. 6), thereby enabling gate SRG. The enablement of gate SRG causes it to transmit an electrical potential change (or positive potential), via amplifier SRA (FIG. 6) and conductor CRC, to the reset conductor R of ring counter TSRC (FIG. 6), thereby causing the trunk hunting cycle of ring counter TSRC to cease, and causing said ring counter to be reset to its No. 0 stage. At the same time, the electrical potential change (or positive potential) on conductor TD20 in cable TDG41 is transmitted to the trunk-designating cross-connecting terminal TDT20 (FIG. 4). The electrical potential change (or positive potential) applied to terminal TDT20 is transmitted, via cross connection TVX20, diode VD20 (FIG. 4), conductor V20, cross-connecting terminal TV0 (FIG. 4), and conductor V0, to the "SET" conductor S of the vertical flip-flop TV0 (FIG. 4), thereby causing flip-flop TV0 to operate. The electrical potential change applied to terminal TDT20 (FIG. 4) is also transmitted, via cross-connection TFX20, diode FD20 (FIG. 4), conductor F20, cross-connecting terminal FR2 (FIG. 4), and conductor TO2, to the "SET" conductor S of the frame flip-flop T2 (FIG. 3), thereby causing flip-flop T2 to operate. The operation of flip-flop TV0 (FIG. 4) causes it to produce an electrical potential change (or positive potential) on its output conductor BU, which positive potential is extended through the winding of relay V0 (FIG. 4) to −24 volts, causing relay V0 to operate. The operation of flip-flop T2 (FIG. 3) causes it to produce an electrical potential change (or positive potential) on its output conductor BU, which positive potential is extended through the winding of relay FR2 (FIG. 3) to −24 volts, causing relay FR2 to operate. The concurrent operation of relays V0 and FR2 comprises the designation of trunk L20 (FIG. 3) for interconnection. Any suitable switching system known in the art may be employed to effect the interconnection. A switching system particularly adapted for this purpose is disclosed and claimed in Patent 3,041,409 to A. Zarouni of June 26, 1962 and entitled Switching System. Portions of the trunk hunting and route advance circuitry of the instant application are disclosed and claimed in the application of A. Zarouni entitled Right-of-Way Switching Circuitry, Serial No. 99,014, filed on the same day as the present application. The electrical potential change (or positive potential) on the output conductor CRC of amplifier SRA (FIG. 6) is also applied to the parallel-connected common reset conductors CR of all of the route advance flip-flops of FIGS. 5 and 7, such, for example, as ML41a (FIG. 5), thereby causing all of the said flip-flops that are turned-on or set at this time to be turned-off or reset.

Now, at this time, let it be assumed that a suitable idle path has been found available in the switching network for interconnecting the incoming line or trunk to the outgoing line or trunk. The availability of such an idle connecting path is evidenced by the operation of the switching network check circuit SNC (FIG. 8), thereby causing an electrical potential change (or positive potential) to appear on its output conductor CC. The electrical potential change on conductor CC is applied to the left-hand input conductor of "OR" gate CKG (FIG. 8), thereby causing an electrical potential change (or positive potential) to appear on its output conductor COID. The electrical potential change on conductor COID is applied to the parallel-connected input conductors of transmission enabling gates PE67, PE19, PE24, PE35 and PE48 (FIG. 6); but, since this is not an ROW message, the said gates will not be enabled at this time, and, hence, the said potential on conductor COID produces no useful effect with respect to said gates. The electrical potential change on conductor COID is also applied to the input conductor DROW of delay circuit RD (FIG. 8), and, after a brief delay interval, is transmitted therethrough to the reset conductor CR of the right-of-way flip-flop RW (FIG. 8); but, since this is not an ROW message, flip-flop ROW will not be in its set or turned-on condition at this time, and, hence, the resetting potential applied thereto will produce no useful effect. Now, at a time shortly subsequent to the operation of the switching network check circuit SNC (FIG. 8), let it also be assumed that the designated trunking path has been established. Under this condition, let it be further assumed that a suitable reset circuit known in the art, and represented by the rectangle designated RSC (FIG. 8), takes cognizance of the establishment of a trunking path and, as a result thereof, causes a positive output potential to appear on its output conductor CRS. The positive potential on conductor CRS is applied to the lower input conductor of the common reset "OR" gate CRG (FIG. 8), thereby enabling gate CRG. The enablement of gate CRG causes it to transmit an electrical potential change (or positive potential), via amplifier CRA (FIG. 8) and common reset conductor CR, to all of the parallel-connected common reset conductors CR of all of the flip-flops of FIGS. 3, 4, 8, 10, and 11, such, for example, as T2 (FIG. 3), TV0 (FIG. 4) and E57 (FIG. 10), thereby causing all of said flip-flops that are turned on at this time to be turned-off or reset. With all of the flip-flops restored to their reset or turned-off condition, the system is in readiness to service another message.

*Reorder*

Now, as an alternative condition incident to seeking an idle trunk to switching center 57, let it be further assumed, for example, that, as above described, not only are all of the trunks in trunk groups 57 and 35 busy, but also that all of the trunks in trunk group 41 are busy. Under this condition, all of the sleeve conductors S20 through S24 (FIG. 3) of trunk group 41 will be at ground (or positive) potential; all of the input conductors of trunk group busy "AND" gate TBG41 (FIG. 5) will be at ground (or positive) potential; and both of the input conductors of all trunks busy "AND" gate ATB41a (FIG. 5) will be at a positive potential, thereby enabling "AND" gate ATB41a. The electrical potential change (or positive potential) on the output conductor C41a of flip-flop ML41a (FIG. 5) is transmitted, via diode D41a (FIG. 5), conductor TG41, and "OR" gate TGG (FIG. 6), as previously described, thereby again initiating the conditional operation of slow-acting gate SCG. Since, in this instance, all of the trunks in trunk group 41 are assumed to be busy, the operation of the ring counter TSRC (FIG. 6) will be prevented by virtue of the delay inherent in slow-acting gate SCG, as previously described with reference to trunk group 57. At this time, since, as previously assumed, this is not an ROW message, there will be no "disabling" potential on conductor ROW; and therefore, the transmission inhibiting gate I41a (FIG. 5) and all of the other transmission inhibiting gates having their control conductors connected to conductor ROW will be in their enabled states.

Gate REa (FIG. 5), it will be remembered, is also in its enabled state. Since, as previously assumed, this is not a "P" message, there will be no inhibiting potential on conductor PRI; and, therefore, the transmission inhibiting gates RNPa (FIG. 5) and RNPc (FIG. 7) will, respectively, be in their enabled states. Therefore, the electrical potential change (or positive potential) on the output conductor C41a of flip-flop ML41a (FIG. 5) is transmitted, via gate ATB41a (FIG. 5), conductor RA5, gate I41a (FIG. 5), conductor RA6, gate REa (FIG. 5), conductor RO*a*, gate RNPa (FIG. 5) and conductor RA7, to "SET" conductor S of route advance reorder flip-flop MRO57a (FIG. 5), causing flip-flop MRO57a to operate and produce an electrical potential change (or positive potential) on its "OUT" conductor CRO57a. The operation of flip-flop MRO57a, in the instant example, indicates that no trunk is idle in any of the trunk groups (i.e., 57, 35 and 41) included in that route advance pattern wherein switching center 57 is the required destination. The electrical potential change (or positive potential) on conductor CRO57a is transmitted, via diode DRO*ab* (FIG. 5) and conductor ROT, to the reorder trunk-designating cross-connecting terminal RDT (FIG. 4). At the same time, the electrical potential change (or positive potential) on conductor CRO57a is applied to the reset conductor R of route advance flip-flop ML41a (FIG. 5), causing flip-flop ML41a to be turned-off or reset. Also, at the same time, the electrical potential change (or positive potential) on conductor ROT is applied to the middle input conductor of "OR" gate SRG (FIG. 6), thereby enabling gate SRG. The enablement of "OR" gate SRG causes it to transmit an electrical potential change (or positive potential), via amplifier SRA (FIG. 6) and conductor CRC, to the parallel-connected common reset conductors CR of all of the route advance flip-flops of FIGS. 5 and 7, thereby causing the resetting or turning-off of flip-flop MRO57a and all of the other of said flip-flops that may be operated or turned-on at this time. The electrical potential change (or positive potential) applied to terminal RDT (FIG. 4) is transmitted, via cross-connection TVR, diode VDR (FIG. 4), conductor VR, cross-connecting terminal TV3 (FIG. 4), and conductor V3, to the "SET" conductor S of the vertical flip-flop TV3 (FIG. 4), thereby causing flip-flop TV3 to operate. The electrical potential change applied to terminal RDT (FIG. 4) is also transmitted, via cross-connection TFR, diode FDR (FIG. 4), conductor FR, cross-connecting terminal FR9 (FIG. 4), and conductor TO9, to the "SET" conductor S of the frame flip-flop T9 (FIG. 4), thereby causing flip-flop T9 to operate. The operation of flip-flop TV3 (FIG. 4) causes it to produce an electrical potential change (or positive potential) on its output conductor BU, which positive potential is extended through the winding of relay V3 (FIG. 4) to −24 volts, causing relay V3 to operate. The operation of flip-flop T9 (FIG. 4) causes it to produce an electrical potential change (or positive potential) on its output conductor BU, which positive potential is extended through the winding of relay FR9 (FIG. 4) to −24 volts causing relay FR9 to operate. The concurrent operation of relays V3 and FR9 comprises the circuit operation, in an aforementioned switching system, whereby the reorder trunk (i.e., L93 FIG. 4) is designated for interconnection. The reorder trunk is terminated in a suitable reorder trunk circuit known in the art, and represented by the rectangle designated RTC (FIG. 4). Said reorder trunk circuit, it will be assumed, provides means whereby a signal may be furnished to indicate to the calling facility that all of the trunks in the several trunk groups affording access to the switching center of destination are busy. When connection has been established to the reorder trunk, the reset circuit RSC (FIG. 8) will take cognizance thereof and will produce a positive potential on its output conductor CRS, thereby causing the release of the flip-flops of FIGS. 3, 4, 8, 10 and 11, and placing the system in readiness to service another message, in the manner previously described.

*Route Advance Patterns Combined*

When, due to traffic conditions, it is deemed desirable, certain trunk groups which are accessible under the control of the flip-flops of a given route advance pattern may be also accessible, in combination with certain other trunk groups, under the control of the flip-flops of another route advance pattern. In the previously-described example, trunk groups 57, 35 and 41 (FIG. 3) are respectively accessible under control of route advance flip-flops ML57a, ML35a and ML41a (FIG. 5), in the order mentioned; and the operation of the flip-flops comprising this route advance pattern is initiated incident to the receipt of a destination code calling for switching center 57 as the switching center of destination.

Now, to illustrate the operation of the above-mentioned combination of route advance patterns let it be assumed, for example, that another nonpriority (NP) message is in process of being served by the switching center (e.g., 23, FIG. 1). Let it be further assumed that said NP message has associated therewith a multidigit address code having included therein, as the respective equivalents of the significant digits P, D, S, and C, the digital combination 2985, for example. In a manner previously described, the digits P, D, S and C are respectively registered in registers W1, W2, W3 and W4 (FIG. 11), and are respectively translated in translators PDT (FIG. 8), DDT, TDT and UDT (FIG. 10); and the translators DDT, TDT and UDT, in a manner similar to that preivously described, jointly cause the operation of "AND" gate 985 (FIG. 10). The operation of "AND" gate 985 causes an electrical potential change (or positive potential) to appear on its output conductor CE85, which output potential is applied to the "SET" conductor S of directional and destination flip-flop E85 (FIG. 10), thereby causing flip-flop E85 to operate. The electrical potential change on conductor CE85 is also applied to the corresponding input conductor of "OR" gate GC1O (FIG. 8), thereby preventing the setting or operation of any of the general code flip-flops EYY, E'YY, WXX and W'XX (FIG. 8), as previously described. The operation of flip-flop E85, in the instant example, indicates that the message is to proceed in an easterly direction and that switching center 85 is the ultimate switching center destination. Flip-flop E85, in its operated condition, causes an electrical potential change (or positive potential) to appear on its "OUT" conductor OE85. The potential change on conductor OE85 in cable OC57 is applied to "SET" conductor S of flip-flop ML85b (FIG. 5), to the parallel-connected control conductors of transmission enabling gates RA26b and RA57a (FIG. 5), and, via cable C1, to the parallel-connected control conductors of transmission enabling gates 85–35b, 85–41b, 85–RO b, 85–26b and 85–57a (FIG. 6), thereby causing flip-flop ML85b to operate, and also causing the said gates to be enabled. The operation of flip-flop ML85b, in the instant example, indicates that trunk group 85 is the first choice in which to seek an idle trunk to switching center 85 as the switching center of destination.

*Trunk Hunting and Route Advance*

The operation of flip-flop ML85b (FIG. 5) causes an electrical potential change (or positive potential) to appear on its "OUT" conductor C85b, which potential change is employed to control the trunk hunting function in trunk group 85, and, in the event of all trunks being busy in trunk group 85, to cause the circuitry to route-advance to the next trunk group included in the route advance pattern, in the same manner as previously described with reference to trunk group 57 as the first choice. However, in the instant example, the route advance pattern comprises memory flip-flops ML85b and ML26b in combination with memory flip-flops ML57a, ML35a, ML41a, and the reorder flip-flop MRO57a (FIG. 5). Hence, in the instant example, the operation of the route advance circuitry differs in some respect to that previously described with reference to trunk group 57 as the first choice. Specifically, let it be assumed, for example, that all of the trunks in trunk group 85 are busy. Since this is not an ROW message, gate I85b (FIG. 5) will be enabled. Gate RA26b (FIG. 5), it will be remembered, is also enabled. Therefore, the positive output potential on conductor C85b is transmitted, via "AND" gate ATB85b (FIG. 5), conductor RA8, gate I85b (FIG. 5), conductor RA9, gate RA26b (FIG. 5) and conductor 26b, to "SET" conductor S of route advance flip-flop ML26b (FIG. 5), causing flip-flop ML26b to operate. The operation of flip-flop ML26b, in the instant example, indicates that trunk group 26 is the second choice in which to seek an idle trunk, whereby indirect access may be had to switching center 85 as the switching center of destination. The operation of flip-flop ML26b causes an electrical potential change (or positive potential) to appear on its "OUT" conductor C26b, which potential change is employed to control the trunk hunting function in trunk group 26, and, in the event of all trunks being busy in trunk group 26, to cause the circuitry to route-advance to the next trunk group included in the route advance pattern, in the manner previously described. Now let it be assumed, for example, that all of the trunks in trunk group 26 are also busy. Since, as previously assumed, this is not an ROW message, gate I26b (FIG. 5) will be enabled. Gate RA57a (FIG. 5) it will be remembered, is also enabled. Therefore, the positive output potential of conductor C26b is transmitted, via "AND" gate ATB26b (FIG. 5), conductor RA10, gate I26b (FIG. 5), conductor RA11, gate RA57a (FIG. 5) and conductor OE57, to "SET" conductor S of flip-flop ML57a (FIG. 5), causing flip-flop ML57a to operate. At the same time, the electrical potential change (or positive potential) on conductor C26b is also applied to the reset conductor R of route advance flip-flop ML85b (FIG. 5), causing flip-flop ML85b to be turned-off or reset. The positive output potential from gate RA57a on conductor OE57 is also applied to the parallel-connected control conductors of transmission enabling gates RA35a, RA41a and REa (FIG. 5), and to the parallel-connected control conductors of transmission enabling gates 57–35a, 57–41a and 57–ROa (FIG. 6), thereby enabling said gates. The operation of flip-flop ML57a (FIG. 5), in the instant example, indicates that trunk group 57 is the third choice in which to seek an idle trunk, whereby indirect access may be had to switching center 85 as the switching center of destination. The operation of flip-flop ML57a (FIG. 5) causes an electrical potential change (or positive potential) to appear on its "OUT" conductor TGC57a. The electrical potential change on conductor TGC57a is employed to control the trunk hunting function in group 57, and, in the event of all trunks in trunk group 57 being busy with other than ROW messages, to cause the circuitry to route advance to the next trunk group included in the route advance pattern, in exactly the same manner as previously described with reference to the condition wherein it was assumed that switching center 57 is the switching center of destination.

Setting of Additional Directional and Destination Flip-Flop

However, in the instant example, it is to be remembered, the directional and destination flip-flop E85 (FIG. 10) was set in response to the received direction and destination code designating switching center 85 as the switching center of destination. Therefore, at this time, the electrical potential change on output conductor TGC57a of route advance flip-flop ML57a (FIG. 5) is transmitted, via conductor E57S in cable OC57, to the "SET" conductor S of directional and destination flip-flop E57 (FIG. 10), causing flip-flop E57 to be set or turned-on. Also, at the same time, the electrical potential change (or positive potential) on conductor TGC57a is applied to the reset conductor R of route advance flip-flop ML26b (FIG. 5), causing flip-flop ML26b to be turned-off or reset. Flip-flop E57 (FIG. 10), in its operated condition, causes an electrical potential change (or positive potential) to appear on its "OUT" conductor OE57, which output potential is applied, via cable OC57, to the "SET" conductor S of flip-flop ML57a (FIG. 5), to the parallel-connected control conductors of transmission enabling gates RA35a, RA41a and REa (FIG. 5), and to the parallel-connected control conductors of transmission enabling gates 57–35a, 57–41a and 57–ROa (FIG. 6), thereby maintaining a "SETTING" potential for flip-flop ML57a, and causing said gates to remain in their enabled states despite the fact that flip-flop ML26b has been reset. The continued enablement, at this time, of gates RA35a, RA41a and REa in the above-described path is of particular significance since, in their enabled condition these gates provide the only path whereby route advance operations may be successively effected, by means of route advance flip-flops ML57a, ML35a, ML41a and, lastly, reorder flip-flop MRO57a, when switching center 85 is specified as the switching center of destination. From this point in the operating cycle, the functions of trunk hunting, route advance, reorder, and resetting-to-normal will be performed in exactly the same manner as earlier described with reference to the condition wherein it was assumed that switching center 57 is the switching center of destination, except that in the instant example switching center 85 is the specified destination.

Other Route Advance Patterns

From the foregoing, it is apparent that access to the various trunk groups at a switching center (e.g., switching center 23, FIG. 1) may be had in accordance with a variety of route advance patterns, such as provided by the route advance flip-flops shown in FIG. 5, and as above described. To further illustrate the flexibility of trunk group usage inherent in the system, still another of the many possible arrangements of route advance flip-flops is shown in FIG. 7. According to this arrangement, trunk groups 26, 57, 41, 85 and 35 (FIG. 3) are respectively accessible under control of route advance flip-flops ML26c, ML57c, ML41c, ML85c and ML35c (FIG. 7), in the order mentioned; and the operation of the flip-flops comprising this route advance pattern is initiated incident to the receipt of a destination code calling for switching center 26 as the switching center of destination.

Now, to illustrate the operation of the above-mentioned route advance pattern, let it be assumed, for example, that still another nonpriority (NP) message is in process of being served by the switching center (e.g., 23, FIG. 1). Let it be further assumed that said NP message has associated therewith a multidigit address code having included therein, as the respective equivalents of the significant digits P, D, S, and C, the digital combination 2926, for example. In a manner previously described, the digits P, D, S, and C are registered and translated; and the translators DDT, TDT and UDT (FIG. 10), in a manner similar to that previously described, jointly cause the operation of "AND" gate 926 (FIG. 10). The operation of "AND" gate 926 causes an electrical potential change (or positive potential) to appear on its output conductor CE26, which output potential is applied to "SET" conductor S of flip-flop E26 (FIG. 10) and to the corresponding input conductor of "OR" gate GCI0 (FIG. 8), thereby causing flip-flop E26 to operate, and also causing gate GCI0 to operate to prevent the setting of any of the general code flip-flops EVY, E'YY, WXX and W'XX (FIG. 8), as previously described. The operations of flip-flop E26, in the instant example, indicates that the message is to proceed in an easterly direction and that switching center 26 is the ultimate switching center destination. Flip-flop E26, in its operated condition, causes an electrical potential change (or positive potential) to appear on its "OUT" conductor OE26. The potential change on conductor OE26 in cable OC57 is applied to "SET" conductor S of flip-flop ML26c (FIG. 7), to the parallel-connected control conductors of transmission enabling gates RA57c, RA41c, RA85c, RA35c and REc (FIG. 7), and to the parallel-connected control conductors of transmission enabling gates 26–35c, 26–41c, 26–ROc, 26–85c and 26–57c (FIG. 6), thereby causing flip-flop ML26c (FIG. 7) to operate, and also causing the said gates to be enabled. The operation of flip-flop ML26c, in the instant example, indicates that trunk group 26 is the first choice in which to seek an idle trunk to switching center 26 as the switching center of destination. The operation of flip-flop ML26c (FIG. 7) causes an electrical potential change (or positive potential) to appear on its "OUT" conductor CR26c. The electrical potential change on conductor CR26c is employed to control the trunk hunting in group 26, and, in the event of all trunks in trunk group 26 being busy, to cause the circuitry to route-advance to the next trunk group included in the route advance pattern. From this point in the operating cycle, the functions of trunk hunting, route advance, reorder and resetting-to-normal will be performed in exactly the same manner as earlier described with reference to the condition wherein it was assumed that switching center 57 is the switching center of destination, with the exception, of course, that in the instant example switching center 26 is the specified destination.

General Codes

In the foregoing detailed circuit description, mention has been made of "general" code flip-flops and the related inhibiting circuitry. To facilitate an understanding of the purpose of such general code circuitry let it be assumed, for example, that in a trunking pattern, such as illustrated in FIG. 1, the instant switching center (e.g., 23, FIG. 1) is serving a message having as its switching center destination a remote switching center (e.g., 86, FIG. 1) which is not directly accessible by means of any of the trunk groups radially extending from the instant switching center, access to which trunk groups may be had by means of the several previously described route advance patterns shown in FIGS. 5 and 7. However, indirect access may be had to such a remote switching center (e.g., 86, FIG. 1) by means of a trunk in one of the trunk groups extending either directly or indirectly from the instant switching center (e.g., 23, FIG. 1) to one of the other switching centers (e.g., 85, FIG. 1), and thence to switching center 86 (FIG. 1).

Now, to illustrate the circuit operation in the case of the above-mentioned "general" code message, let it be assumed, for example, that said "general" code message is a nonpriority (NP) message having associated therewith a multidigit address code having included therein, as the respective equivalents of the significant digits P, D, S and C, the digital combination 2986. In the manner previously described, the digits P, D, S and C are registered and translated. Since the P digit is a "2," and since the No. 2 output terminal of priority translator PDT (FIG. 8) is not cross-connected, translator PDT, as previously explained, will effectively produce a negative response. Since the D digit is a "9," the electrical potential change (or positive potential) on the No. 9 output terminal of directional translator DDT (FIG. 8) is cross-connected over a previously described path to the input conductor 986 of delay circuit DE (FIG. 8), which causes delay circuit DE, after a brief delay, to produce an electrical potential change (or positive potential) on its output conductor DEO. Since the S and C digits are, respectively "8" and "6," jointly indicative of a "general" code, there is no "AND" gate (i.e., 986) corresponding thereto, and, hence, the No. 8 and No. 5 output terminals of translators TDT and UDT (FIG. 10), respectively, are not cross-connected as they would be if this were a specific code. Therefore, at this time, there is no input to the "OR" gate GCI0 (FIG. 8); there is no inhibiting potential on the output conductor GCI of gate GCI0; and, hence, the transmission enabling gates GIE, GIE′, GIW and GIW′ (FIG. 8) are in their enabled states. The delayed electrical potential change on conductor DEO is transmitted, via gate GIE and conductor ES, to the "SET" conductor S of the general code flip-flop EYY (FIG. 8), causing flip-flop EYY to operate. The operation of flip-flop EYY, in the instant example, indicates that the message is to proceed in an easterly direction. Flip-flop EYY, in its operated condition, causes an electrical potential change (or positive potential) to appear on its "OUT" conductor OEYY. The potential change on conductor OEYY in cable OC57 is applied, via conductor OE85, to the "SET" conductor S of flip-flop ML85b (FIG. 5), to the parallel-connected control conductors of transmission enabling gates RA26b and RA57a (FIG. 5), and, via cable C1, to the parallel-connected control conductors of transmission enabling gates 85–35b, 85–41b, 85–ROb, 85–26b and 85–57a (FIG. 6), thereby causing flip-flop ML85b to operate, and also causing the said gates to be enabled. The operation of flip-flop ML85b, in the instant example, indicates that trunk group 85 is the first choice in which to seek an idle trunk to switching center 85 whence, under control of the stored S and C digits an idle trunk will be sought to the switching center of destination (e.g., 86). From this point in the operating cycle, the functions of trunk hunting, route advance, reorder and resetting to normal will be performed in exactly the same manner as earlier described with reference to the condition wherein it was assumed that switching center 85 is the switching center of destination, with the exception, of course, that in the instant example switching center 86 is specified as the remote switching center destination.

*Other Code-Responsive Circuits*

In FIGS. 8 and 10, in addition to the above-described code-responsive circuits (i.e., flip-flops E57 E85, E26 and EYY) are shown certain other code-responsive circuits, the operations of which are not described in detail, nor are the outputs of the flip-flops of these circuits shown connected to route advance circuits. The outputs of the unconnected flip-flops may be used to control additional or alternative route advance pattern circuitry as required. These undescribed circuits, it will be discerned from the drawings, are structurally similar to their above-described homologues.

To further facilitate an understanding of the functioning of the code-responsive direction and destination flip-flop circuitry, a résumé of the received codes and the respective responses thereto appears in the appended table.

| Received Code Digits | | Operates Directional and Destination Flip-flop | Operates Route Advance Circuitry To Seek Trunk in Trunk-Groups | | | | | | Comments |
|---|---|---|---|---|---|---|---|---|---|
| A Direction | B C Switching Center Destination | | | | | | | | |
| 9=East | 26 | E26 | 26 | 57 | 41 | 85 | 35* | RO(93) | Shown and described. |
| 5*=East′ | 26 | E′ 26 | 26* | 57* | 41* | 85* | RO(93) | | |
| 9=East | 35 | E35 | 35* | RO(93) | | | | | Route Adv. Connections Not Shown. |
| 9=East | 41 | E41 | 41 | 57 | 35* | RO(93) | | | |
| 5*=East′ | 41 | E′ 41 | 41* | 57* | RO(93) | | | | |
| 9=East | 57 | E57 | 57 | 35* | 41 | RO(93) | | | Shown and described. Rt. Adv. Conn. Not Shown. |
| 5*=East′ | 57 | E′ 57 | 57* | 41* | RO(93) | | | | |
| 9=East | 85 | E85 | 85 | 26 | 57 | 35* | 41 | RO(93) | Shown and described. |
| 5*=East′ | 85 | E′ 85 | 85* | 26* | 57* | 41* | RO(93) | | |
| 6=West | 00 | W00 | 00 | 35* | RO(93) | | | | Ct. Adv. Conn. Not Shown. |
| 0*=West′ | 00 | W′ 00 | 00 | RO(93) | | | | | |
| 9=East | YY=86 | EYY | 85 | 26 | 57 | 35* | 41 | RO(93) | General Code—Shown and described. |
| 5*=East′ | YY=86 | E′ YY | 85* | 26* | 57* | 41* | RO(93) | | |
| 6=West | XX=01 | WXX | 00 | 35* | RO(93) | | | | General Codes—Route Adv. Conns. Not Shown. |
| 0*=West′ | XX=01 | W′ XX | 00 | RO(93) | | | | | |

*Code Conversion of Direction Digit (A) Required.

*Right-of-Way Message*

Right-of-way (ROW) messages will, in general, obtain access, via modified or partly inhibited route advance circuitry, to the same trunk groups as described in the foregoing detailed description with reference to nonpriority (NP) messages. However, in the case of ROW messages, certain "class-of-service" circuitry will be operated in order to establish that the incoming message is, in fact, entitled to be forwarded on an ROW basis; and the operation of such "class-of-service" circuitry will also partly inhibit or modify the regular operation of the route advance equipment, and will control the trunk hunting equipment, so that the ROW message may be accorded "bump-off" or trunk pre-empeting privileges.

As a first example, let it be assumed that an ROW message is in process of being served by the switching center (e.g., 23, FIG. 1). Let it be further assumed that said ROW message has associated therewith a multidigit address code having included therein, as the respective equivalents of the significant digits P, D, S, and C, the digital combination 9957, for example. In a manner previously described, the digits P, D, S, and C are registered and translated. The class-of-service register CSR (FIG. 11), it is assumed, will have ascertained that the incoming message is entitled to ROW service and will, accordingly, have caused an electrical potential change (or positive potential) to appear on its output conductor CC. The potential change on conductor CC is employed, in the manner previously described, to cause the enablement of gate SLG (FIG. 8). The P digit, in the instant example, being assumed to be a "9," causes the priority translator PDT (FIG. 8) to transmit a potential charge representing a corresponding "9" decimal code output, via a previously-described cross-connecting path and the enabled gate SLG, to "SET" conductor S of right-of-way flip-flop RW (FIG. 8), causing flip-flop RW to operate and produce an electrical potential change (or positive potential) on its "OUT" conductor ROW. The electrical potential change on conductor ROW is applied to the parallel-connected control conductors of transmission inhibiting gates of FIGS. 5 and 7 (e.g., I57a), thereby disabling said gates and inhibiting the normal operation of the route advance circuitry. The output potential on conductor ROW is also applied to the parallel-connected control conductors of the pairs of transmission enabling gates (e.g., pair BU07 and PE07) of FIG. 6, thereby enabling said gates and, in part, preparing operating paths for the "bump-off" circuitry.

The D, S, and C digits, in the instant example, being respectively assumed to be "9," "5" and "7," are the same as earlier described with reference to a nonpriority message wherein the digital combination was 2957. Therefore, the output potentials of translators DDT, TDT and UDT (FIG. 10) are applied, over previously-described paths, to the D, T and U input terminals, respectively, of "AND" gate 957 (FIG. 10). The concurrent application of potential change conditions to the D, T and U terminals of "AND" gate 957 causes an electrical potential (or positive potential) to appear on its output conductor CE57, which output potential is applied to the "SET" conductor S of flip-flop E57 (FIG. 10) and to the corresponding input conductor of "OR" gate GCI0 (FIG. 8), thereby causing flip-flop E57 to operate, and also causing gate GCI0 to operate to prevent the setting of any of the general code flip-flops (e.g., EYY, FIG. 8), as previously described. The operation of flip-flop E57, in the instant example, and as before, indicates that the message is to proceed in an easterly direction to switching center 57, as the switching center destination. The operation of flip-flop E57 produces an output potential which is transmitted, via a previously-described path, causing the operation of flip-flop ML57a (FIG. 5), the transmission enabling gates RA35a, RA41a and REa (FIG. 5), and the transmission enabling gates 57–35a, 57–41a and 57–ROa (FIG. 6). The operation of flip-flop ML57a, in the instant example, indicates that trunk group 57 is the first choice in which to seek an idle trunk to switching center 57, or to pre-empt the services of the last trunk of the group if it is busy with other than an ROW message.

*Route Advance—Modified for ROW*

The operation of flip-flop ML57a (FIG. 5), as before, causes an electrical potential change (or positive potential) to appear on its "OUT" conductor TGC57a, which output potential is transmitted, via diode D57a and conductor TG57, to one of the inputs of the "OR" gate TGG (FIG. 6), and to the parallel-connected control conductors of all of the transmission enabling gates TG03 through TG07 (FIG. 6), thereby enabling said "OR" gate and said transmission enabling gates. The enablement of "OR" gate TGG causes it to transmit an electrical potential change, via conductor GC, to the control conductor of the slow-acting transmission enabling gate SCG (FIG. 6). The electrical potential change on conductor GC, if of sufficient duration, will permit the 100 kilocycle oscillator CO (FIG. 6) to transmit a pulse, via conductor 00, gate SCG and conductor SCC, to the "START" conductor S of the trunk scanning ring counter TSRC (FIG. 6), thereby causing the ring counter TSRC to start its trunk scanning cycle to seek an idle trunk in trunk group 57, as previously explained. The electrical potential change on conductor TG57 is also transmitted, via a previously-described path, to the input conductor of the auxiliary memory set transmission enabling gate AS57 (FIG. 9), but, as previously explained, since this is not a (P) priority message, the said auxiliary circuitry is not enabled to perform any function at this time. The electrical potential change on conductor TGC57a is also applied to the reset conductor R of flip-flop ML26b (FIG. 5) to the upper input conductor of "AND" gate ATB57a (FIG. 5), and, via conductor E57S in cable OC57, to the "SET" conductor S of flip-flop E57 (FIG. 10), as previously described.

Now let it be assumed, for example, that in trunk group 57, trunks L03, L04, L05 and L06 are all busy and that trunk L07 is busy with an ROW message. Under this condition, the sleeve conductors S03, S04, S05, S06 and S07 will be at ground (or positive) potential. These sleeve potentials are applied, via a previously-described path, to the control conductors of gates BTG03, BTG04, BTG05, BTG06 and BTG07, respectively (FIG. 6), thereby disabling all of said gates. The said sleeve potentials on the sleeve conductors of trunk group 57 are also applied, via a previously-described path, to the input conductors S57–1, S57–2, S57–3, S57–4 and S57–5, respectively, of "AND" gate TGB57 (FIG. 5). With the concurrent application of ground (or positive) potentials to all of the input conductors of "AND" gate TGB57, an electrical potential change (or positive potential) appears on output conductor TGC57, thereby indicating, as before, that all of the trunks in trunk group 57 are busy. Under this condition, the electrical potential change on conductor TGC57 is applied to the parallel-connected lower input conductors of "AND" gates ATB57a (FIG. 5) and ATB57c (FIG. 7). The upper input conductor of gate ATB57a (FIG. 5), at this time, also has a positive potential applied thereto, as previously described. The electrical potential change (or positive potential) on conductor TCG57 is also applied to the control conductor of transmission inhibiting gate AIG57 (FIG. 9), thereby disabling gate AIG57. The concurrent application of positive potentials to both of the input conductors of "AND" gate ATB57a (FIG. 5) causes an electrical potential change (or positive potential) to appear on its output conductor RA1, as before. At this time, since this is an ROW message, gate I57a (FIG. 5), it will be remembered, is in a disabled condition. Therefore, the potential change on conductor RA1 is prevented from being applied, via gate RA35a (FIG. 5), to the "SET" conductor S of flip-flop ML35a (FIG. 5); and, thus, the normal operation of the route advance circuitry is inhibited. Having in mind the assumption that the last trunk (i.e., L07, FIG. 3) of trunk group 57 is, at this time, serving an ROW message, it must be further assumed that the memory flip-flop MO7 (FIG. 6), in a manner to be later described, has been operated to its "SET" condition; that the output of flip-flop MO7 has caused transmission inhibiting gate PR07 (FIG. 6) to change to its disabled state; and that the output of flip-flop M07 has caused transmission enabling gate ALT07 (FIG. 6) to change to its enabled state.

*Route Advance—Alternative Paths*

Assuming that flip-flop ML57a (FIG. 5) has been operated for an interval of sufficient duration, the output potential therefrom, applied over a previously-described path, causes the enablement of slow-acting gate SCG (FIG. 6) which, in turn, causes the trunk scanning ring counter TSRC (FIG. 6) to start its scanning cycle, in the manner previously described. As the ring counter TSRC successively advances through stages 1 to 4, inclusive, the paths through gates BTG03 to BTG06, inclusive, are blocked because of the disablement of said gates. However, when the ring counter TSRC has advanced to its No. 5 stage, an electrical potential change (or positive potential) will be transmitted from stage No. 5, via an alternate route advance control path comprising conductor SC5, gate TG07, conductor RB07, gate ALT07, gate 57–35a (FIG. 6), and conductor 35a in cable C1, to the "SET" conductor S of flip-flop ML35a (FIG. 5), causing flip-flop ML35a to operate and produce an electrical potential change (or positive potential) on its "OUT" conductor C35a. The operation of flip-flop ML35a, in the instant example, indicates that trunk group 35 is the second choice in which to seek an idle trunk, or to pre-empt the services of the last trunk of the group if it is busy with other than an ROW message, whereby indirect access may be had to switching center 57. The electrical potential change (or positive potential) on conductor C35a is transmitted, via diode D35a (FIG. 5) and conductor TG35, to the input conductor TG35 of "OR" gate TGG (FIG. 6), and to the parallel-connected control conductors of all of the transmission enabling gates TG15 through TG19 (FIG. 6), thereby again enabling said "OR" gate, and enabling said transmission enabling gates. The enablement of "OR" gate TGG again initiates the conditional operation of slow-acting gate SCG (FIG. 6) which, in turn, again initiates the conditional start of the ring counter TSRC (FIG. 6), in the manner previously described. The electrical potential change on conductor TG35 is also transmitted, via a previously-described path, to the input conductor of the auxiliary memory gate AS35 (FIG. 9), but, as previously explained, since this is not a (P) priority message, the said auxiliary memory circuitry is not enabled at this time. At the same time, the electrical potential change (or positive potential) on conductor C35a is applied to the reset conductor R of flip-flop ML57a (FIG. 5), causing flip-flop ML57a to be reset. The potential change on conductor C35a is also applied to the upper input conductor of "AND" gate ATB35a (FIG. 5), and to one of the input conductors of code conversion "OR" gate COG (FIG. 7), as previously described.

Now let it be assumed, for example, that in trunk group 35 (as in trunk group 57) all five trunks are busy, and the last trunk is busy with an ROW message. Under this condition, all of the sleeve conductors of trunk group 35 (FIG. 3) will be at ground (or positive) potential, which potentials are applied, via a path similar to that previously described with reference to trunk group 57, to the control conductors of gates BTG15, BTG16, BTG17, BTG18 and BTG19, respectively (FIG. 6), thereby disabling all of said gates. The said potentials on the sleeve conductors S15 to S19, inclusive, of trunk group 35 are also applied, via a previously-described path, respectively to the corresponding input conductors of "AND" gate TGB35 (FIG. 5). With the concurrent application of ground (or positive) potentials to all of the input conductors of "AND" gate TGB35, an electrical potential change (or positive potential) appears on output conductor TGC-35, thereby indicating, as before, that all of the trunks in trunk group 35 are busy. Under this condition, the electrical potential change on conductor TGC35 is applied to the parallel-connected lower input conductors of "AND" gates ATB35a (FIG. 5) and ATB35c (FIG. 7). The upper input conductor of gate ATB35a, it will be remembered, also has a positive potential applied thereto, as previously described. The electrical potential change (or positive potential) on conductor TGC35 is also applied to the control conductor of transmission inhibiting gate AIG35 (FIG. 9), thereby disabling gate AIG35. The concurrent application of positive potentials to both of the input conductors of "AND" gate ATB35a (FIG. 5) causes an electrical potential change (or positive potential) to appear on its output conductor RA3, as before. At this time, since this is an ROW message, gate 135a (FIG. 5), it will be remembered, is in a disabled condition. Therefor, the potential change on conductor RA3 is prevented from being applied, via gate RA41a (FIG. 5), to the "SET" conductor S of flip-flop ML41a (FIG. 5), thereby again inhibiting the normal operation of the route advance circuitry. Bearing in mind the assumption that the last trunk (i.e., L19, FIG. 3) of trunk group 35, is at this time, serving an ROW message, it must be further assumed that the memory flip-flop M19 (FIG. 6) has operated to its "SET" condition, that the output potential of flip-flop M19 has caused transmission inhibiting gate PR19 (FIG. 6) to change to its disabled state, and that the output potential of flip-flop M19 has caused transmission enabling gate ALT19 (FIG. 6) to change to its enabled state.

Assuming that the flip-flop ML35a (FIG. 5) has been operated for an interval of sufficient duration, the output potential therefrom, applied over a previously-described path, again causes the enablement of slow-acting gate SCG (FIG. 6) which, in turn, again causes the trunk scanning ring counter TSRC (FIG. 6) to start its scanning cycle. As the ring counter TSRC again successively advances through stages 1 to 4, inclusive, the paths through gates BTF15 to BTG18, inclusive, are blocked because of the disablement of said gates. However, when the ring counter TSRC has again advanced to its No. 5 stage, an electrical potential change (or positive potential) will be transmitted from stage No. 5, via an alternate route advance control path comprising conductor SC5, gate TG19, conductor RB19, gate ALT19, gate 57–41a (FIG. 6), and conductor 41a in cable C1, to the "SET" conductor S of flip-flop ML41a (FIG. 5), causing flip-flop ML41a to operate and produce an electrical potential change (or positive potential) on its "OUT" conductor C41a. The operation of flip-flop ML41a, in the instant example, indicates that trunk group 41 is the third choice in which to seek an idle trunk, or to pre-empt the services of the last trunk of the group if it is busy with other than an ROW message, whereby indirect access may be had to switching center 57. The electrical potential change (or positive potential) on conductor C41a is transmitted, via diode D41a (FIG. 5) and conductor TG41, to the input conductor TG41 of "OR" gate TGG (FIG. 6), and to the parallel-connected control conductors of all of the transmission enabling gates TG20 through TG24 (FIG. 6), thereby again enabling said "OR" gate, and enabling said transmission enabling gates. The enablement of "OR" gate TGG again initiates the conditional operation of slow-acting gate SCG (FIG. 6) which, in turn, again initiates the conditional start of the ring counter TSRC (FIG. 6), in the manner previously described. The electrical potential change on conductor TG41 is also transmitted, via a previously-described path, to the input conductor of the auxiliary memory gate AS41 (FIG. 9), but, as previously explained, since this is not a (P) priority message, the said auxiliary memory circuitry is not enabled at this time. At the same time, the electrical potential change (or positive potential) on conductor C41a is applied to the reset conductor R of flop-flop ML35a (FIG. 5), causing flip-flop ML35a to be reset. The potential change on conductor C41a is also applied to the upper input conductor of "AND" gate ATB41a (FIG. 5).

*"Bump-Off*

Now let it be assumed, for example, that in trunk group 41 all of the trunks are busy and that the last trunk in the group is busy with a non-right-of-way message. Under this condition, all of the sleeve conductors of trunk group 41 will be at ground (or positive) potential, which potentials are applied, via a path similar to that previously described with reference to trunk group 57, to the control conductors of gates BTG20, BTG21, BTG22, BTR23 and BTG 24, respectively (FIG. 6), thereby disabling all of said gates. The said potentials on the sleeve conductors S20 to S24, inclusive, of trunk group 41 are also applied, via a previously-described path, respectively, to the corresponding input conductors of "AND" gate TGB41 (FIG. 5). With the concurrent application of ground (or positive) potentials to all of the input conductors of "AND" gate TGB41, an electrical potenial change (or positive potential) appears on output conductor TGC41, thereby indicating, as before, that all of the trunks in trunk group 41 are busy. Under this condition, the electrical potential change on conductor TGC41 is applied to the parallel-connected lower input conductors of "AND" gates ATB41a (FIG. 5) and ATB41c (FIG. 7). The upper input conductor of gate ATB41a, it will be remembered, also has a positive potential applied thereto, as previously described. The electrical potential change (or positive potential) on conductor TGC41 is also applied to the control conductor of transmission inhibiting gate AIG41 (FIG. 9), thereby disabling gate AIG41. The concurrent application of positive potentials to both of the input conductors of "AND" gate ATB41a (FIG. 5) causes an electrical potential change (or positive potential) to appear on its output conductor RA5, as before. At this time, since this is an ROW message, gate 141a (FIG. 5), it will be remembered, is in a disabled condition. Therefore, the potential change on conductor RA5 is prevented from being applied, via gate REa, conductor ROa and gate RNPa (FIG. 5) to the "SET" conductor S of flip-flop MRO57a (FIG. 5), thereby again inhibiting the normal operation of the route advance circuitry. Now, having in mind the assumption that the last trunk (i.e., L24, FIG. 3) of trunk group 41 is, at this time, servicing a non-ROW message, it must be further assumed that the memory flip-flop M24 (FIG. 6) is in its normal or unoperated condition, that the transmission inhibiting gate PR24 (FIG. 6) is in its normal or enabled condition, and that the transmission enabling gate ALT24 (FIG. 6) is in its normal or disabled condition. Also, it will be remembered the transmission enabling gates BU24 and PE24 (FIG. 6) are in their enabled conditions, as previously described.

*Route Advance—Alternative Paths*

Assuming that the flip-flop ML41a (FIG. 5) has been operated for an interval of sufficient duration, the output potential therefrom, applied over a previously-described path, again causes the enablement of slow-acting gate SCG (FIG. 6) which, in turn, again causes the trunk scanning ring counter TSRC (FIG. 6) to start its scanning cycle, in the manner previously described. As the ring counter TSRC again successively advances through stages 1 to 4, inclusive, the paths through gates BTG20 to BTG23, inclusive, are blocked because of the disablement of said gates. However, when the ring counter TSRC has again advanced to its No. 5 stage, an electrical potential change (or positive potential) will be transmitted from stage No. 5, via a "bump-off" enabling path comprising conductor SC5, gate TG24, conductor RB24, gate PR24, gate BU24, conductor I24, regenerative amplifier RA24, and conductor O24 to the control conductor of "bump-off" control enabling gate BG24 (FIG. 6), thereby enabling gate BG24.

*"Bump-Off" Signal*

A source of "bump-off" or disconnect signals is represented by the rectangle SBUS (FIG. 6), which signal source may be any suitable device known in the art for generating a suitable signal recognizable by the associated line or trunk circuitry as a directive to disconnect. A signal is now transmitted from SBUS (FIG. 6), via conductor BUS, gate BG24 (FIG. 6), conductor RB41, a suitable cross-connecting path, and ring conductor R24, to the terminating circuit (CCT.24, FIG. 3) of trunk circuit L24 which trunk, it will be remembered, is assumed to be busy with a non-ROW message.

*Release of Trunk*

When the trunk circuit (i.e., L24, FIG.3) shall have started to release, the ground (or positive) potential on its sleeve conductor S24 is removed, and, in its stead, a transistory negative-going potential is applied to sleeve conductor S24, which negative-going potential is extended, via a suitable cross-connecting path, sleeve conductor S41–5 in cable S41, and capacitor C24 (FIG. 6), to the input of amplifier A24 (FIG. 6). The output potential of amplifier A24 is applied to the reset conductor R of memory flip-flop M24 (FIG. 6), thereby providing a reset potential for flip-flop M24. However, since it is assumed that trunk L24 has been busy with a non-ROW message, flip-flop M24, at this time, is in its normal or nonoperated condition and, hence, the negative-going resetting potential performs no useful function at this time. When the trunk circuit L24 and the switching connection therefor shall have fully released, the negative-going potential on sleeve conductor S24 is supplanted by a steady negative potential, thereby indicating that trunk L24 has become idle. The steady negative potential on sleeve conductor S24 is also applied, via the above-described path, to the control conductor of transmission inhibiting gate BTG24 (FIG. 6), thereby enabling gate BTG24.

*Reseizure of Trunk*

The ring counter TSRC (FIG. 6) continues its operation and starts to repeat its scanning cycle. As the ring counter TSRC again successively advances through stages 1 to 4, inclusive, the paths through gates BTG20 to BTG23, inclusive, are again blocked because of the continued disablement of said gates. However, at this time, when the ring counter TSRC has again advanced to its No. 5 stage, an electrical potential change (or positive potential) will be transmitted from stage No. 5, via conductor SC5, gate TG24 (FIG. 6), conductor 41–4, gate BTG24 (FIG. 6), to the trunk-designating conductor TD24. The electrical potential change (or positive potential) on conductor TD24 is applied to the correspondingly-numbered input conductor of "OR" gate OR41 (FIG. 6), thereby enabling gate OR41. The enablement of gate OR41 causes it to transmit an electrical potential change (or positive potential), via conductor RS, to the lower input conductor of "OR" gate SRG (FIG. 6), thereby enabling gate SRG, and thereby causing the ring counter TSRC (FIG. 6) to be reset to its No. 0 stage, in the manner previously described. At the same time, the electrical potential change (or positive potential) on conductor TD24, in cable TDG41, is transmitted to the trunk-designating cross-conecting terminal TDT24 (FIG. 4). The electrical potential change (or positive potential) applied to terminal TDT24 is transmitted, via cross-connection TVX24, diode VD24 (FIG. 4), conductor V24, cross-connecting terminal TV4 (FIG. 4), and conductor V4, to the "SET" conductor S of the vertical flip-flop TV4 (FIG. 4), thereby causing flip-flop TV4 to operate. The electrical potential change applied to terminal TD24 (FIG. 4) is also transmitted, via cross-connection TFX24, diode FD24 (FIG. 4), conductor F24, cross-connecting terminal FR2 (FIG. 4), and conductor TO2, to the "SET" conductor S of the frame flip-flop T2 (FIG. 3), thereby causing flip-flop T2 to operate. The concurrent operation of flip-flops TV4 and T0, and the concomitant operation of relays V4 (FIG. 4) and FR2 (FIG. 3), in a manner similar to that previously described, comprises the circuit operation, in a switching system, whereby the "bumped-off" or "pre-empted" trunk L24 is designated to serve the instant ROW message.

The electrical potential change (or positive potential) on the output conductor CRC of amplifier SRA (FIG. 6) is also applied to the parallel-connected reset common conductors CR of all of the flip-flops of FIGS. 5 and 7, causing them to be reset, as previously described.

Now, at this time, let it be assumed that a suitable idle path has been found available in the switching network for interconnecting the incoming and outgoing lines or trunks; and, that as a result of such availability, the switching network check circuit SNC (FIG. 8) is operated, thereby causing an electrical potential change (or positive potential) to appear on its output conductor CC. The electrical potential change on conductor CC is applied to one of the input conductors of "OR" gate CKG (FIG. 8), thereby causing an electrical potential change (or positive potential) to appear on its output conductor COID. The electrical potential change on conductor COID is applied to the parallel-connected input conductors of transmission enabling gates PE07, PE19, PE24, PE35 and PE48 (FIG. 6); and since this is an ROW message, the said gates, it will be remembered, are in their enabled states because of the positive potential on conductor ROW (i.e., the output potential from flip-flop RW, FIG. 8). The electrical potential change (or positive potential) on conductor COID is transmitted through gate PE24 to the "SET" conductor S of memory flip-flop M24 (FIG. 6), causing flip-flop M24 to become operated or turned on, thereby to "remember" that trunk L24 is now engaged in serving an ROW message, and, therefore, may not be pre-empted or "bumped-off." The electrical potential change on conductor COID is also applied to the input conductor DROW of delay circuit RD (FIG. 8), and, after a brief delay interval, sufficient to permit flip-flop M24 to be operated, is transmitted therethrough to the reset conductor CR of the right-of-way flip-flop RW (FIG. 8), as earlier described; and since this is an ROW message, flip-flop RW will now be caused to become reset or restored to its normal state, thereby removing the positive potential from its output conductor ROW. Now, at this time, shortly subsequent to the operation of the switching network check circuit SNC (FIG. 8), let it also be assumed that the designated "bump-off" trunking path has been established. Under this condition, the reset circuit RSC (FIG. 8) takes cognizance thereof and, in the manner previously described, effects the release of the control circuitry, and places the system in readiness to service another message.

*ROW—"Reorder"*

Now, as an alternative condition incident to seeking an idle trunk to switching center 57 to serve an ROW message, let it be further assumed, for example as above described, not only that the first four trunks in trunk groups 57 and 35 are busy and the last trunks in trunk groups 57 and 35 are busy with ROW messages, but also that the first four trunks of trunk group 41 are busy and that the last trunk in trunk group 41 is busy with an ROW message. Under this condition, the same sleeve supervisory conditions will obtain as previously described with reference to trunk group 35, and the operation of trunk scanning ring counter TSRC (FIG. 6) will again be initiated. When the ring counter TSRC has again advanced to its No. 5 stage, an electrical potential change (or positive potential) will be transmitted from stage No. 5, via an alternate route advance control path comprising conductor SC5, gate TD24, conductor RB24, gate ALT24, gate 57-ROa (FIG. 6), conductor ROa in cable C1, and gate RNPa (FIG. 5), to the "SET" conductor S of flip-flop MRO57a (FIG. 5), causing flip-flop MRO57a to operate and produce an electrical potential change (or positive potential) on its "OUT" conductor CRO57a. The operation of flip-flop MRO57a, in the instant example, indicates that all of the first four trunks in trunk groups 57, 35 and 41 are busy, and that the last trunks in said trunk groups are respectively busy with ROW messages. The operation of flip-flop MRO57a effectuates a series of circuit operations, which operations are exactly as previously described with reference to "Reorder," and culminate in the seizure of a reorder trunk, and the previously-described circuit operations concomitant thereto.

*Priority Message*

Priority (P) messages will, in general, obtain access, under control of route advance circuitry, to the same trunk groups and in the same manner as described in the foregoing detailed description with reference to nonpriority (NP) messages. However, in the case of P messages, in the event that in any trunk group included in the route advance pattern no idle trunk is available, the operation of the "reorder" circuitry is inhibited. Under the P or priority message condition, certain "auxiliary memory" circuitry is effectuated whereby to register or "remember" the identity of the trunk group or groups in which an idle trunk has been sought. When all of the trunks in all of the trunk groups are busy, circuitry is effectuated whereby to cause the release of the route advance and trunk hunting circuitry, to monitor the "remembered" trunk groups to detect when an idle trunk therein shall have become available, and then to cause the trunk hunting cycle and route advance pattern to be repeated, if required.

As a first example, let it be assumed that a P message is in process of being served by the switching center (e.g., 23, FIG. 1). Let it be further assumed that said P message has associated therewith a multidigit address code having included therein, as the respective equivalents of the significant digits P, D, S, and C, the digital combination 8957, for example. In a manner previously described, the digits P, D, S, and C are registered and translated. The class-of-service register CSR (FIG. 11), it is assumed, will have ascertained that the incoming message is not entitled to ROW service, and, accordingly, will not have operated and, hence, the absence of an electrical potential change (or positive potential) on the output conductor CC of register CSR precludes the operation of the special loop flip-flop SL (FIG. 8); and the non-operation of flip-flop SL, in turn, precludes the enablement of gate SLG (FIG. 8), controlled thereby.

The P digit, in the instant example, being assumed to be an "8," causes the priority translator PDT (FIG. 8) to transmit a potential change representing a corresponding "8" decimal code output, via a previously-described cross-connecting path, to the priority flip-flop PR (FIG. 8), causing flip-flop PR to operate and produce an electrical potential change (or positive potential) on its "OUT" conductor PRI. The electrical potential change on conductor PRI is applied to the parallel-connected input conductors of transmission inhibiting gate RNPa and transmission enabling gate AMPa (FIG. 5), to the parallel-connected input conductors of transmission inhibiting gate RNPc and transmission enabling gate AMPc (FIG. 7), thereby disabling gates RNPa and RNPc, and enabling gates AMPa and AMPc. Gate AGE (FIG. 9), it will be remembered, is in its enabled state. Therefore, at this time, the potential change on conductor PRI is also applied, via transmission enabling gate AGE, to the parallel-connected control conductors of the auxiliary memory transmission enabling gates AS57, AS35, AS41, AS85 and AS26 (FIG. 9), thereby enabling said auxiliary memory gates. The operation of the route advance circuitry has now been modified and the auxiliary memory circuitry has been conditioned to permit priority treatment to be accorded to the instant (P) message.

The D, S, and C digits, in the instant example, being respectively assumed to be "9," "5" and "7" are the same as earlier described with reference to a nonpriority message wherein the digital combination was 2957. Therefore, the route advance and the trunk hunting circuitry will function exactly as previously described with reference to the said nonpriority message except for the additional auxiliary memory circuit operations initiated by the received (P) priority code and effective incident to the seeking of an idle trunk in any trunk group.

*Auxiliary Memory Registration*

Let it be assumed, for example, that, in response to the received destination condition, and in the manner previously described with reference to an NP message, flip-flop ML57a (FIG. 5) has been operated, that an idle trunk has been unsuccessfully sought in trunk group 57, and that the route advance circuitry has caused flip-flop ML35a (FIG. 5) to operate. During the interval that flip-flop ML57a is operated, the electrical potential change (or positive potential) on conductor TG57 is transmitted, via enabled gate AMG57, conductor A57, and enabled gate AS57, to the "SET" conductor S of auxiliary memory flip-flop AML57 (FIG. 9), causing flip-flop AML57 to operate. Let it be further assumed, for example, that in response to the operation of flip-flop ML35a, and in the manner previously described, an idle trunk has been unsuccessfully sought in trunk group 35, and that the route advance circuitry has caused flip-flop ML41a (FIG. 5) to operate. During the interval that flip-flop ML35a is operated, the electrical potential change (or positive potential) on conductor TG35 is transmitted, via enabled gate AMG35, conductor A35, and enabled gate AS35, to the "SET" conductor S of auxiliary memory flip-flop AML35 (FIG. 9), causing flip-flop AML35 to operate.

Now let it be assumed, for example, that the first trunk (i.e., L20) in trunk group 41 (FIG. 3) is idle and that the remaining trunks in trunk group 41 are busy. Under this condition, the electrical potential change (or positive potential) on conductor TG41 is transmitted, via enabled gate AMG41, conductor A41 and enabled gate AS41, to the "SET" conductor S of auxiliary memory flip-flop AML41 (FIG. 9) causing flip-flop AML41 to operate. By the operation of the auxiliary memory flip-flops AML57, AML35 and AML41, the "memory" is registered that an idle trunk has successively been sought in trunk groups 57, 35 and 41.

*Seizure of an Idle Trunk*

Since it is assumed that the trunk group being scanned at this time has an idle trunk therein (i.e., trunk L20 in trunk group 41), and since this is a P message, the trunk selecting and trunk designating equipment will operate in exactly the same manner as previously described with reference to an NP message, and will culminate in the seizure of an idle trunk (i.e., L20), and the previously-described circuit operations concomitant thereto, with the exception, however, that in the instant example the operated auxiliary memory flip-flops are released as described in the following description. When the ring counter TSRC (FIG. 6) has advanced to its No. 1 stage, as previously described, an electrical potential change (or positive potential) is transmitted from stage No. 1, via conductor SC1, gate TG20, conductor 41-1, gate BTG20 and conductor TD20, to one of the input conductors of "OR" gate OR41 (FIG. 6), thereby enabling gate OR41. The enablement of gate OR41 causes it to transmit an electrical potential change (or positive potential), via conductor RS, enabled gate ARE, and conductor AR to one of the input conductors of "OR" gate ARG (FIG. 9), thereby enabling gate ARG. The enablement of gate ARG causes it to transmit an electrical potential charge (or positive potential), via conductor ACR, to the parallel-connected common reset conductors CR of the auxiliary memory flip-flops AUX, AML57, AML35, AML41, AML85 and AML26 (FIG. 9), thereby causing the resetting of flip-flops AML57, AML35 and AML41.

*Failure To Find Idle Trunk*

Now, as an alternative condition incident to seeking an idle trunk to switching center 57 to serve a priority (P) message, let it be further assumed, for example as above described, not only that all of the trunks in trunk groups 57 and 35 are busy, but also that all of the trunks in trunk group 41 are busy. Under this condition, in accordance with the previously-described circuit operations, both of the input conductors of "AND" gate ATB41a (FIG. 5) have positive potentials applied thereto, and that, since this is not an ROW message, gate I41a (FIG. 5) is in its enabled state. Therefore, at this time, the electrical potential change (or positive potential) on the "OUT" conductor "O" of flip-flop ML41a (FIG. 5) is transmitted, via "AND" gate ATB41a, conductor RA5, gate I41a, conductor RA6, gate REa, conductor ROa, gate AMPa (FIG. 5), conductor AMC and enabled gate AFE, to the "SET" conductor S of auxiliary control flip-flop AUX (FIG. 9), causing flip-flop AUX to operate and produce an electrical potential change (or positive potential) on its "OUT" conductor "O." At the same time, the electrical potential change (or positive potential) on conductor AMC is also applied to one of the input conductors of "OR" gate SRG (FIG. 6), to one of the input conductors of "OR" gate CRG (FIG. 8), and to the right-hand input conductor of "OR" gate CKG (FIG. 8).

The electrical potential change on conductor AMC, and applied to the upper input conductor of "OR" gate SRG (FIG. 6), causes the enablement of gate SRG, thereby causing ring counter TSRC (FIG. 6) to be reset to its "0" stage, and also causing the operated route advance memory flip-flops (i.e., ML41a) to be reset, as previously described. The electrical potential change on conductor AMC, and applied to the upper input conductor of "OR" gate CRG (FIG. 8), causes the enablement of said gate, thereby causing the energization of amplifier CRA (FIG. 8) which, in turn, causes the resetting of all of the directional, destination, and control flip-flops that may be turned on at this time, to be turned off or reset. Obviously, since no idle trunk was found, and since the reorder trunk was not seized, none of the trunk-designating flip-flops will have been turned on, and, hence, will not require resetting. The electrical potential change on conductor AMC, and applied to the right-hand conductor of gate CKG (FIG. 8), causes the enablement of gate CKG and the consequent appearance of an electrical potential change or resetting potential on conductor COID, as previously described; but, since this is not an ROW message, and for the reasons previously explained with reference to ROW messages, the said resetting potential on conductor COID will produce no useful effect.

The gate control flip-flop GC (FIG. 11), it will be remembered, has been restored to its normal condition by the resetting potential supplied thereto by amplifier CRA (FIG. 8), via conductor CR. Therefore, in the absence of a suitable positive output potential on the "OUT" conductor SMC of flip-flop GC, all of the register control gates RCG (FIGS. 9 and 11) will be in their disabled states. Because of the disablement of gates RCG, the digital register circuitry of FIG. 11 will be disconnected from the translator circuitry of FIGS. 8 and 10, and the "SET" conductors of the auxiliary memory flip-flops of FIG. 9 will be disconnected from the route advance circuitry of FIGS. 5 and 7. Under this condition, the digital register circuitry of FIG. 11 retains the received digital information, and auxiliary memory flip-flops of FIG. 9 retain or "remember" the identities of the trunk groups wherein an idle trunk was sought. The electrical potential change (or positive potential) on the "OUT" conductor "O" of auxiliary flip-flop AUX (FIG. 9) is applied, via conductor AME, to the parallel-connected control conductors of all of the transmission enabling gates AEG57, AEG35, AEG41, AEG85 and AEG26 (FIG. 9), thereby enabling all of said gates. Since, in the instant example, it is assumed that all of the trunks in trunk groups 57, 35 and 41 are busy, all of the input conductors of "AND" gates TGB57, TGB35 and TGB41 (FIG. 5) will have ground (or positive) potentials applied thereto, and their respective output conductors TGC57, TGC35 and TGC41 would have positive potentials appearing thereon. The positive potentials on conductors TGC57, TGC35 and TGC41 are respectively applied to the control conductors of transmission inhibiting gates AIG57, AIG35 and AIG41 (FIG. 9) thereby disabling said gates.

Trunk Becomes Idle

Now, at this time, let it be assumed, for example, that in the interim the first trunk (i.e., L20) in trunk group 41 has reverted to its normal or idle state. Under this condition, the ground (or positive) potential on the sleeve conductor S20 of trunk L20 (FIG. 3) is supplanted by a steady negative potential, thereby indicating that trunk L20 has become idle. The steady negative potential on conductor S20 is extended, via a previously-described path, to the input conductor S41-1 of "AND" gate TGB41 (FIG. 5) and to the control conductor of transmission enabling gate BTG20 (FIG. 6). Since it is assumed that, at this time, trunk L20 is the only idle trunk in trunk group 41, the remaining input conductors of "AND" gate TGB41 will be at ground (or positive) potential. Since less than all of the input conductors of "AND" gate TGB41 have ground (or positive) potentials connected thereto, the output conductor TGC41 of "AND" gate TGB41 will remain at its normal potential, that is to say, gate TGB41 will not produce an electrical potential change (or positive potential) on conductor TGC41. Since the route advance flip-flops of FIG. 5 have been reset, as above described, the route advance circuitry performs no function at this time. The normal electrical potential on conductor TGC41 is applied to the control conductor of transmission inhibiting gate AIG41 (FIG. 9), thereby permitting gate AIG41 to remain in its enabled state, as previously described. Since it is assumed that of the trunks in trunk groups 57 and 35 are busy, all of the input conductors of both of the "AND" gates TGB57 and TGB35 (FIG. 5) will have ground (or positive) potentials thereon and, consequently, their respective output conductors TGC57 and TGC35 will have electrical potential changes (or positive potentials) appearing thereon. The positive potentials on conductors TGC57 and TGC35 are respectively applied to the control conductors of transmission inhibiting gates AIG57 and AIG35 (FIG. 6), thereby disabling said gates. As a consequence of the enablement of gates AIG41 (FIG. 9), the electrical potential change (or positive potential) on the "OUT" conductor "O" of the auxiliary memory flip-flop AML41 (FIG. 9) is transmitted, via conductor A41-1, gate AEG41, conductor A41-2, gate AIG41 and conductor A41-3 to the input conductor 41 of "OR" gate AOG (FIG. 9), thereby causing an electrical potential change (or positive potential) to appear on its output conductor ACC. At this time, even though the auxiliary memory flip-flops AML57 and AML35 (FIG. 9) are also in their operated conditions, the output potentials therefrom are blocked because their respectively related transmission inhibiting gates AIG57 and AIG35 (FIG. 9) are disabled because, as above described, there are no idle trunks in trunk groups 57 and 35.

The electrical potential change (or positive potential) on conductor ACC is applied to the "SET" conductor S of the gate control flip-flop GC (FIG. 11) in lieu of an output potential from the start circuit S (FIG. 11), thereby causing flip-flop GC to reoperate, as previously described, and to produce an electrical potential change (or positive potential) on its "OUT" conductor SMC. The reoperation of flip-flop GC, effectively, apprises the digital register circuitry that, in an unspecified trunk group, an unspecified trunk has become idle. At the same time, the electrical potential change (or positive potential) on conductor ACC is also applied to the lower input conductor of "OR" gate ARG (FIG. 9), thereby enabling gate ARG. The enablement of gate ARG causes it to transmit an electrical potential change (or positive potential), via conductor ACR, to the parallel-connected common reset conductors CR of all of the auxiliary memory flip-flops of FIG. 9, thereby causing the resetting of flip-flops AML57, AML35 and AML41.

Reoperation of Register Connector Gates

The electrical potential change (or positive potential) on the "OUT" conductor SNC of the gate control flip-flop GC (FIG. 11) is again applied to the parallel-connected control conductors of all of the transmission enabling gates of the register connector gates RCG (FIGS. 9 and 11), thereby causing said gates to again become enabled. The re-enablement of the register connector gates RCG reconnects the digital registers of FIG. 11 to the translating circuitry of FIGS. 8 and 10, and, at the same time, reconnects the "SET" conductors S of the auxiliary memory flip-flops of FIG. 9 to the route advance circuitry of FIGS. 5 and 6, in exactly the same manner as above described with reference to the priority "P" message.

Reoperation of Translators and Flip-Flops

From this point in the operating cycle, the functions of code translation, setting of the directional and destination flip-flops, and the consequent setting of the route advance flip-flops will be performed in exactly the same manner as above described with reference to the priority (P) message. In the instant example, the route advance flip-flop ML57a (FIG. 5) will again operate and will again initiate the operation of the trunk hunting and route advance circuitry, in exactly the same manner as above described with reference to the "P" message.

It should be noted that despite the fact that the first trunk in trunk group 41 had become idle, and in so doing had caused the reoperation of the gate control flip-flop GC (FIG. 11), there is the possibility that, in the interim, a trunk also may have become idle in either trunk group 57 or 35 or both. Therefore, at this time, an idle trunk will again be successively sought in trunk groups 57, 35 or 41, and in that order, and the first idle trunk found in one of these trunk groups will be seized to serve the instant priority (P) message.

After the instant priority message shall have been served, the functions of resetting the circuits to normal will be performed in exactly the same manner as previously described with reference to the serving of a P message.

It is to be understood that the calls traced hereinabove are entirely by way of illustration and are in no wise to be construed as limiting the operation of the system to the calls so traced.

It is also to be understood that the above-described arrangements are merely illustrative of the application of the principles of the invention, and that numerous other arrangements may be devised by those skilled in the art without departing from the spirit and scope of the invention.

What is claimed is:

1. In a switching system wherein trunks are designated for service under the control of route codes; means operable to register a route code; a plurality of groups of trunks whereof certain groups represent alternate routes for certain registered codes; means individual to and controlled by each trunk group to indicate whether or not at least one of the trunks in said group is idle; a route advance test circuit selectively operable under the control of said operated registering means to test the said indicating means in a prescribed order of trunk groups among those groups representing alternate routes for said registered code; and a trunk hunting circuit selectively operable under the control of said operated test circuit to hunt for an idle trunk in that group whose indicating means is first in said prescribed order to indicate that there is at least one idle trunk in that group.

2. In a switching system wherein trunks are designated for service under the control of route codes; means operable to register a route code; a plurality of groups of trunks whereof certain groups represent alternate routes for certain registered codes; means individual to and controlled by each trunk group to indicate whether or not at least one of the trunks in said group is idle; a route advance test circuit selectively operable under the control of said operated registering means to test the said indicating means in a prescribed order of trunk groups among those groups representing alternate routes for said registered code; and a trunk hunting circuit selectively operable under the control of said operated test circuit to hunt for an idle trunk in that group whose indicating means is first in said prescribed order to indicate that there is at least one idle trunk in that group; wherein means is provided controlled by said operated hunting circuit incident to finding an idle trunk to designate for service said idle trunk and to release said operated test circuit and to release said operated hunting circuit and controlled by said operated test circuit incident to finding an all-trunk-groups-busy condition among said prescribed indicating means to release said operated test circuit.

3. In a switching system wherein trunks are designated for service under the control of route codes; means operable to register a route code; a plurality of groups of trunks whereof certain groups represent alternate routes for certain registered codes; means individual to and controlled by each trunk group to indicate whether or not at least one of the trunks in said group is idle; a route advance test circuit selectively operable under the control of said operated registering means to test the said indicating means in a prescribed order of trunk groups among those groups representing alternate routes for said registered code; and a trunk hunting circuit selectively operable under the control of said operated test circuit to hunt for an idle trunk in that group whose indicating means is first in said prescribed order to indicate that there is at least one idle trunk in that group; wherein each said indicating means comprises a signal device for supplying a first signal whenever all trunks in the corresponding group are busy and a second signal whenever at least one trunk in said corresponding group is idle; wherein said test circuit comprises a start-stop sensing circuit started under the control of said operated registering means for sensing the type of signal supplied by those signal devices representing alternate route trunk groups for said registered code and stopped under the control of the first in said order of those said signal devices supplying a said second signal; and, wherein said hunting circuit includes means controlled by the stopping of said sensing circuit for selecting that group of trunks individual to said first signal device and for hunting in said selected group for an idle trunk.

4. The invention defined in claim 3 wherein said sensing circuit comprises an operable test device for each trunk group, first circuit means controlled by said operated registering means for operating one test device representing the preferred route trunk group for said registered code and for rendering operable all other test devices representing less-preferred route trunk groups for said registered code, and second circuit means controlled by said operated one test device and responsive to a said first signal supplied by the signal device corresponding to the same trunk group for operating another test device representing a less-preferred route trunk group for said registered code and for releasing said operated one test device.

5. The invention defined in claim 4 wherein each said signal device is a signal gate having an output terminal and having an input terminal per trunk and connected thereto, said signal gate arranged so that said output terminal is adjusted to a first electrical potential representing said first signal whenever all of its input terminals are connected to busy trunks and is adjusted to a second electrical potential representing said second signal whenever at least one of its input terminals is connected to an idle trunk; wherein said second circuit means comprises an advance gate per trunk group and having an output terminal and having two input terminals, one input terminal connected to and controlled by the corresponding trunk group signal gate output terminal and the second input terminal controlled by the corresponding trunk group test device, said advance gate arranged so that its output terminal is adjusted to an operating electrical potential only when its two input terminals are controlled by a first potential from a signal gate and by an operated test device; and, wherein said second circuit means also include circuitry interconnecting the output terminal of an advance gate to the next less-preferred trunk group test device and interconnecting the said next less-preferred trunk group test device to the said previous preferred trunk group test device.

6. The invention defined in claim 5 wherein each test device is a flip-flop having a set terminal and an output terminal and a reset terminal; wherein each signal gate is an "AND" gate; wherein each advance gate is an "AND" gate; wherein said first circuit rendering means comprises a transmission enabling gate for each said other flip-flop and having an input terminal controlled by the output terminal of the previous advance "AND" gate and an output terminal connected to the set terminal of the corresponding flip-flop and a control terminal controlled by said operated registering means; wherein the output terminals of a corresponding pair of flip-flop and signal "AND" gates are connected to the two input terminals of the corresponding advance "AND" gate; and, wherein the output terminal of each said other flip-flop is connected to the reset terminal of the previous flip-flop; whereby said operated registering means sets the preferred trunk group flip-flop and enables the said other flip-flop enabling gates, said preferred group advance "AND" gate responds to its operated flip-flop to provide an operating output only when the corresponding signal "AND" gate supplies said first potential, said enabled next less-preferred group enabling gate responds to said operating output to set the corresponding next less-preferred flip-flop, said latter set flip-flop resets the previously set flip-flop, and said step-by-step advance of flip-flop settings and resettings stops whenever the signal "AND" gate corresponding to a set flip-flop supplies said second potential.

7. The invention defined in claim 6 wherein said hunting circuit selecting and hunting means comprises slow-acting gate means connected to and controlled by all of said flip-flop output terminals where said slow-acting gate means is responsive to the output of a flip-flop only after a delay time longer than the time between the setting of one flip-flop and the resetting of said one flip-flop upon the setting of the next flip-flop.

8. The invention defined in claim 7 wherein said hunting circuit includes an operable trunk group scanner common to all trunk groups, a set of scanner output gates for each trunk group and controlled by the corresponding flip-flop output terminal to allow the operated scanner to scan only the trunks in the corresponding group, and a scanner operating circuit including said slow-acting gate for operating said scanner whenever said delay time is of sufficient duration to signify whenever said flip-flop step-by-step advance has stopped.

9. In a switching system wherein trunks are designated for service under the control of route codes; means operable to register a route code; a plurality of groups of trunks whereof certain groups represent alternate routes for certain registered codes; means controlled by each trunk group to indicate whether or not at least one of the trunks in said group is idle; and, means controlled jointly by said operated registering means and by said indicating means incident to an indication that an all-trunk-groups-busy condition prevails among those certain groups representing alternate routes for said registered code to monitor said indicating means for an indication that at least one trunk in those said certain groups becomes idle.

10. The invention defined in claim 9 wherein means is provided controlled jointly by said operated registering means and by said monitoring means incident to an indication that at least one trunk in those said certain groups becomes idle to hunt for an idle trunk among those said certain groups.

11. The invention defined in claim 9 wherein is provided means operable to detect a priority signal associated with said registered code; and, wherein said monitoring means is controlled jointly by said operated registering means and by said operated detecting means and by said indicating means.

12. The invention defined in claim 11 wherein means is provided controlled jointly by said operated registering means and by said monitoring means incident to an indication that at least one trunk in those said certain groups becomes idle to hunt for an idle trunk among those said certain groups.

13. In a switching system wherein trunks are designated for service under the control of route codes; means operable to register a route code; means operable to detect a priority signal associated with said registered code; a plurality of groups of trunks whereof certain groups represent alternate routes for certain registered codes; means individual to and controlled by each trunk group to indicate whether or not at least one of the trunks in said group is idle; a route advance test circuit selectively operable under the control of said operated code registering means to test the said indicating means in a prescribed order of trunk groups among those groups representing alternate routes for said registered code; a route advance memory circuit selectively operable under the joint control of said operated detecting means and of said operated test circuit to register an identification of each indicating means tested by said test circuit; and, a trunk hunting circuit selectively operable under the control of said operated test circuit to hunt for an idle trunk in that group whose indicating means is first in said prescribed order to indicate that there is at least one idle trunk in that group.

14. The invention defined in claim 13 wherein are provided first means controlled jointly by said operated test circuit and by said operated detecting means incident to finding an all-trunk-groups-busy condition among said prescribed indicating means to release said operated test circuit and to cause said operated memory circuit to monitor said prescribed indicating means; and, second means operable under the control of said memory circuit incident to at least one of said monitored indicating means indicating that there is at least one idle trunk in the groups being monitored to release said operated memory circuit and to again selectively operate said test circuit under the control of said operated code registering means.

15. The invention defined in claim 13 wherein said test circuit includes a test device for each trunk group and operated to test the corresponding trunk group indicating means; and, wherein said memory circuit includes an operable memory device for each said indicating means, first circuitry controlled by said operated detecting means for enabling said memory devices to be operated, and second circuitry controlled by said test circuit for operating each said enabled memory device corresponding to an operated test device.

16. The invention defined in claim 15 wherein said second circuitry comprises an operating circuit for each said memory device and controlled by an operated corresponding test device; and, wherein said first circuitry comprises control means in said operating circuits for enabling said operating circuits only when said detecting means is operated.

17. The invention defined in claim 16 wherein each said memory device is a flip-flop having a set terminal energizable by a control signal to set said flip-flop into an operate condition; wherein said first circuitry control means comprises a control gate corresponding to each memory flip-flop, each said control gate having an input terminal and having an output terminal and having a control terminal interconnected with said detecting means, said control gate effective only when said detecting means is operated to allow its output terminal to be affected by a control signal at its input terminal; wherein each said flip-flop operating circuit comprises an interconnection from an operated corresponding test device to the corresponding control gate input terminal and from the corresponding control gate output terminal to said flip-flop set terminal; and, wherein each operated test device applies a control signal to the corresponding control gate input terminal.

18. The invention defined in claim 17 wherein are provided first means controlled jointly by said operated test circuit and by said operated detecting means incident to finding an all-trunk-groups-busy condition among said prescribed indicating means to release said operated test circuit and to cause said operated memory flip-flops to monitor said prescribed indicating means; and, second means operable under the control of said operated memory flip-flops incident to at least one of said monitored indicating means indicating that there is at least one idle trunk in the groups being monitored to release said operated memory flip-flops and to again selectively operate said test circuit under the control of said operated registering means.

19. The invention defined in claim 18 wherein each said memory flip-flop has an output terminal providing a first potential only when said flip-flop is set into an operated condition; wherein said second means comprises a control gate responsive to a said first potential to effect said releasing and selective reoperating functions; and, wherein said first means includes gate circuitry interconnected between said memory flip-flop output terminals and said control gate, said gate circuitry controlled jointly by said operated test circuit and by said operated detecting means and by said trunk group indicating means for gating said first potential to said control gate from the output terminal of any operated memory flip-flop corresponding to a trunk group wherein a trunk becomes idle.

20. The invention defined in claim 19 wherein said gate circuitry includes a pair of transmission gates for each memory flip-flop, each transmission gate having an input terminal and an output terminal and a control terminal, the input terminal of one transmission gate of a pair connected to the output terminal of the corresponding memory flip-flop, the output terminal of said one transmission gate connected to the input terminal of the other transmission gate of the pair, the output terminal of each said other transmission gate connected to said control gate, the control terminal of each said one transmission gate of each pair being in circuit with and controlled by said test circuit, and the control terminal of each said other transmisison gate being in circuit with and controlled by the said indicating means corresponding to the same trunk group as said other transmisison gate.

21. The invention defined in claim 20 wherein said one transmission gate is a transmission enabling gate and said other gate is a transmission disabling gate; and, wherein said gate circuitry further includes a control flip-flop having set and output terminals, said control flip-flop set terminal connected to said test circuit whereby said control flip-flop is set into an operated condition whenever said test circuit finds an all-trunk-groups-busy condition with said detecting means operated, said control flip-flop output terminal connected to the control terminals of all of said transmission enabling gates whereby said latter gates are enabled only when said control flip-flop is operated.

22. The invention defined in claim 21 wherein said control gate is an OR gate having an input terminal for and connected to each transmission disabling gate output terminal and having an output terminal energizable whenever any OR gate input terminal has gated thereto a said first potential from any said operated memory flip-flop; wherein said operated control flip-flop enables transmission from an operated memory flip-flop output terminal through the corresponding transmisison enabling gate to the input of the corresponding transmission disabling gate; wherein each said indicating means disables transmission through the corresponding transmission disabling gate until at least one trunk in the corresponding trunk group becomes idle, whereupon the latter said transmission gate is enabled; and, wherein said second means includes circuitry controlled by energization of said OR gate output terminal to perform the said releasing and selective reoperating functions.

References Cited in the file of this patent

UNITED STATES PATENTS

| | | |
|---|---|---|
| 2,700,702 | Lesigne et al. | Jan. 15, 1955 |
| 2,857,467 | Molnar | Oct. 21, 1958 |
| 2,938,960 | Harris | May 31, 1960 |